(12) United States Patent
Barnhill et al.

(10) Patent No.: US 12,296,535 B2
(45) Date of Patent: May 13, 2025

(54) ATTACHMENT STRUCTURE FOR ADDITIVE MANUFACTURING

(71) Applicant: General Electric Company, Schenectady, NY (US)

(72) Inventors: Christopher David Barnhill, Cincinnati, OH (US); Zhen Liu, Niskayuna, NY (US); Trent William Muhlenkamp, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 742 days.

(21) Appl. No.: 17/410,314

(22) Filed: Aug. 24, 2021

(65) Prior Publication Data
US 2023/0067394 A1    Mar. 2, 2023

(51) Int. Cl.
| | |
|---|---|
| B29C 64/321 | (2017.01) |
| B29C 64/124 | (2017.01) |
| B29C 64/245 | (2017.01) |
| B29C 64/25 | (2017.01) |
| B33Y 30/00 | (2015.01) |

(52) U.S. Cl.
CPC .......... *B29C 64/321* (2017.08); *B29C 64/124* (2017.08); *B29C 64/245* (2017.08); *B29C 64/25* (2017.08); *B33Y 30/00* (2014.12)

(58) Field of Classification Search
CPC ....... B29C 64/20; B29C 64/25; B29C 64/223; B29C 64/321; B29C 64/245; B33Y 30/00; B33Y 40/00
See application file for complete search history.

(56) References Cited

U.S. PATENT DOCUMENTS

| | | |
|---|---|---|
| 1,990,749 A | 2/1935 | Phillips et al. |
| 2,259,517 A | 10/1941 | Drenkard, Jr. |
| 3,264,103 A | 8/1966 | Cohen et al. |
| 3,395,014 A | 7/1968 | Cohen et al. |

(Continued)

FOREIGN PATENT DOCUMENTS

| | | |
|---|---|---|
| CN | 101628477 A | 1/2010 |
| CN | 103210344 A | 7/2013 |

(Continued)

OTHER PUBLICATIONS

Admatec, Admaflex 300 DLP 3D Printer, Specifications, Features, Design and Functions, Netherlands, 2 Pages. Retrieved Nov. 5, 2020 from Webpage: https://admateceurope.com/files/10fla369c2239943 e6506f27ba920bd4dd9359078e744369695ab6ffbde75c6c?filename= Admaflex%20300%20brochure.pdf&sig=hQyDlzxkSmFOZwiM.

(Continued)

*Primary Examiner* — Jerzi H Moreno Hernandez
(74) *Attorney, Agent, or Firm* — Dority & Manning, P.A.

(57) ABSTRACT

An additive manufacturing apparatus includes a build module. A feed module is configured to support a first portion of a resin support. The first portion of the resin support is supported by a feed mounting panel. A take-up module is configured to support a second portion of the resin support. The second portion of the resin support is supported by a take-up mounting panel and is positioned on an opposing side of the radiant energy device from the feed module. An adjustment assembly is configured to adjust a position of at least one of a feed mandrel within the feed module or a take-up mandrel within the take-up module.

19 Claims, 17 Drawing Sheets

(56) References Cited

U.S. PATENT DOCUMENTS

| | | | |
|---|---|---|---|
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Tada et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,607,540 A * | 3/1997 | Onishi ............... B29C 64/141 |
| | | 156/235 |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 * | 4/2002 | Robinson ............... B29C 41/28 |
| | | 425/223 |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |
| 7,164,420 B2 | 1/2007 | Ard |
| 7,195,472 B2 | 3/2007 | John |
| 7,261,542 B2 | 8/2007 | Hickerson et al. |
| 7,270,528 B2 | 9/2007 | Sherwood |
| 7,300,613 B2 | 11/2007 | Sano et al. |
| 7,351,304 B2 | 4/2008 | Liang et al. |
| 7,402,219 B2 | 7/2008 | Graf |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,555,726 B2 | 6/2009 | Kurtenbach et al. |
| 7,569,174 B2 | 8/2009 | Ruatta et al. |
| 7,572,403 B2 | 8/2009 | Gu et al. |
| 7,575,682 B2 | 8/2009 | Olsta et al. |
| 7,578,958 B2 | 8/2009 | Patel et al. |
| 7,614,866 B2 | 11/2009 | Sperry et al. |
| 7,614,886 B2 | 11/2009 | Sperry et al. |
| 7,636,610 B2 | 12/2009 | Schillen et al. |
| 7,698,947 B2 | 4/2010 | Sarr |
| 7,706,910 B2 | 4/2010 | Hull et al. |
| 7,742,060 B2 | 6/2010 | Maillot |
| 7,758,799 B2 | 7/2010 | Hull et al. |
| 7,767,132 B2 | 8/2010 | Patel et al. |
| 7,771,183 B2 | 8/2010 | Hull et al. |
| 7,780,429 B2 | 8/2010 | Kikuchi |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |

(56) References Cited

U.S. PATENT DOCUMENTS

| | | |
|---|---|---|
| 7,892,474 B2 | 2/2011 | Shkolnik et al. |
| 7,894,921 B2 | 2/2011 | John et al. |
| 7,931,460 B2 | 4/2011 | Scott et al. |
| 7,962,238 B2 | 6/2011 | Shkolnik et al. |
| 7,964,047 B2 | 6/2011 | Ishida |
| 7,995,073 B1 | 8/2011 | Shemanarev et al. |
| 8,003,040 B2 | 8/2011 | El-Siblani |
| 8,071,055 B2 | 9/2011 | Davidson et al. |
| 8,029,642 B2 | 10/2011 | Hagman |
| 8,048,261 B2 | 11/2011 | McCowin |
| 8,070,473 B2 | 12/2011 | Kozlak |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,096,262 B2 | 6/2012 | Ederer et al. |
| 8,191,500 B2 | 6/2012 | Dohring et al. |
| 8,211,226 B2 | 7/2012 | Bredt et al. |
| 8,232,444 B2 | 7/2012 | Bar Nathan et al. |
| 8,259,103 B2 | 9/2012 | Glueck et al. |
| 8,269,767 B2 | 9/2012 | Glueck et al. |
| 8,282,866 B2 | 10/2012 | Hiraide |
| 8,326,024 B2 | 12/2012 | Shkolnik |
| 8,372,330 B2 | 2/2013 | El-Siblani et al. |
| 8,394,313 B2 | 3/2013 | El-Siblani et al. |
| 8,413,578 B2 | 4/2013 | Doyle |
| 8,424,580 B2 | 4/2013 | Anderson et al. |
| 8,444,903 B2 | 5/2013 | Lyons et al. |
| 8,454,879 B2 | 6/2013 | Kuzusako et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,513,562 B2 | 8/2013 | Bichsel |
| 8,522,159 B2 | 8/2013 | Kurtenbach et al. |
| 8,540,501 B2 | 9/2013 | Yasukochi |
| 8,568,646 B2 | 10/2013 | Wang et al. |
| 8,568,649 B1 | 10/2013 | Balistreri et al. |
| 8,593,083 B2 | 11/2013 | Firhoj et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,663,568 B2 | 3/2014 | Bar Nathan et al. |
| 8,666,142 B2 | 3/2014 | Shkolnik et al. |
| 8,703,037 B2 | 4/2014 | Hull et al. |
| 8,715,832 B2 | 5/2014 | Ederer et al. |
| 8,718,522 B2 | 5/2014 | Chillscyzn et al. |
| 8,737,862 B2 * | 5/2014 | Manico ............... B41J 3/54 399/77 |
| 8,741,194 B1 | 6/2014 | Ederer et al. |
| 8,741,203 B2 | 6/2014 | Liska et al. |
| 8,744,184 B2 | 6/2014 | Ameline et al. |
| 8,761,918 B2 | 6/2014 | Silverbrook |
| 8,801,418 B2 | 8/2014 | El-Siblani et al. |
| 8,805,064 B2 | 8/2014 | Ameline et al. |
| 8,815,143 B2 | 8/2014 | John et al. |
| 8,844,133 B2 | 8/2014 | Fuller |
| 8,845,316 B2 | 9/2014 | Schillen et al. |
| 8,845,953 B1 | 9/2014 | Balistreri et al. |
| 8,862,260 B2 | 10/2014 | Shkolnik et al. |
| 8,872,024 B2 | 10/2014 | Jamar et al. |
| 8,873,024 B2 | 10/2014 | Jamar et al. |
| 8,876,513 B2 | 11/2014 | Lim et al. |
| 8,877,115 B2 | 11/2014 | Elsey |
| 8,888,480 B2 | 11/2014 | Yoo et al. |
| 8,915,728 B2 | 12/2014 | Mironets et al. |
| 8,926,304 B1 | 1/2015 | Chen |
| 8,932,511 B2 | 1/2015 | Napendensky |
| 8,968,625 B2 | 3/2015 | Tan |
| 8,974,717 B2 | 3/2015 | Maguire et al. |
| 8,991,211 B1 | 3/2015 | Arlotti et al. |
| 8,992,816 B2 | 3/2015 | Jonasson et al. |
| 8,998,601 B2 | 4/2015 | Busato |
| 9,011,982 B2 | 4/2015 | Muller et al. |
| 9,031,680 B2 | 5/2015 | Napadensky |
| 9,063,376 B2 | 6/2015 | Mizumura |
| 9,064,922 B2 | 6/2015 | Nakajima et al. |
| 9,067,359 B2 | 6/2015 | Rohner et al. |
| 9,067,360 B2 | 6/2015 | Wehning et al. |
| 9,067,361 B2 | 6/2015 | El-Siblani |
| 9,073,260 B2 | 7/2015 | El-Siblani et al. |
| 9,079,357 B2 | 7/2015 | Ebert et al. |
| 9,101,321 B1 | 8/2015 | Kiesser |
| 9,149,986 B2 | 10/2015 | Huang et al. |
| 9,150,032 B2 | 10/2015 | Roof et al. |
| 9,153,052 B2 | 10/2015 | Ameline et al. |
| 9,159,155 B2 | 10/2015 | Andersen |
| 9,186,847 B2 | 11/2015 | Fruth et al. |
| 9,193,112 B2 | 11/2015 | Ohkusa et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,221,100 B2 | 12/2015 | Schwarze et al. |
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,346,217 B2 | 5/2016 | Huang et al. |
| 9,346,218 B2 | 5/2016 | Chen et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,443 B2 | 8/2016 | Ljungblad et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,486,964 B2 | 11/2016 | Joyce |
| 9,487,443 B2 | 11/2016 | Watanabe |
| 9,498,920 B2 | 11/2016 | DeSimone et al. |
| 9,498,921 B2 | 11/2016 | Teulet |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,527,272 B2 | 12/2016 | Steele |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,550,326 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,610,616 B2 | 4/2017 | Chen et al. |
| 9,616,620 B2 | 4/2017 | Hoechsmann et al. |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,656,344 B2 | 5/2017 | Kironn et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |

(56) References Cited

U.S. PATENT DOCUMENTS

| | | |
|---|---|---|
| 9,688,027 B2 | 6/2017 | Batchelder et al. |
| 9,707,720 B2 | 7/2017 | Chen et al. |
| 9,720,363 B2 | 8/2017 | Chillscyzn et al. |
| 9,738,034 B2 | 8/2017 | Gruber et al. |
| 9,738,564 B2 | 8/2017 | Capobianco et al. |
| 9,751,292 B2 | 9/2017 | Jamar et al. |
| 9,764,513 B2 | 9/2017 | Stampfl et al. |
| 9,764,535 B2 | 9/2017 | Xie et al. |
| 9,821,546 B2 | 11/2017 | Schaafsma et al. |
| 9,862,146 B2 | 1/2018 | Driessen et al. |
| 9,862,150 B2 | 1/2018 | Chen et al. |
| 9,868,255 B2 | 1/2018 | Comb et al. |
| 9,885,987 B2 | 2/2018 | Chillscysn et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 9,919,515 B2 | 3/2018 | Daniell et al. |
| 9,950,368 B2 | 4/2018 | Lampenscherf et al. |
| 9,956,727 B2 | 5/2018 | Steele |
| 9,962,767 B2 | 5/2018 | Buller et al. |
| 9,981,411 B2 | 5/2018 | Green et al. |
| 10,000,023 B2 | 6/2018 | El-Siblani et al. |
| 10,011,076 B2 | 7/2018 | El-Siblani et al. |
| 10,061,302 B2 | 8/2018 | Jacobs et al. |
| 10,071,422 B2 | 9/2018 | Buller et al. |
| 10,124,532 B2 | 11/2018 | El-Siblani et al. |
| 10,150,254 B2 | 12/2018 | Bauman et al. |
| 10,155,345 B2 | 12/2018 | Ermoshkin et al. |
| 10,155,882 B2 | 12/2018 | Rolland et al. |
| 10,183,330 B2 | 1/2019 | Buller et al. |
| 10,183,444 B2 | 1/2019 | Campbell |
| 10,240,066 B2 | 3/2019 | Rolland et al. |
| 10,245,784 B2 | 4/2019 | Teken et al. |
| 10,317,882 B2 | 6/2019 | De Pena et al. |
| 10,336,055 B2 | 7/2019 | Das et al. |
| 10,336,057 B2 | 7/2019 | Moore et al. |
| 10,350,823 B2 | 7/2019 | Rolland et al. |
| 10,357,956 B2 | 7/2019 | Usami et al. |
| 10,406,748 B2 | 9/2019 | Honda |
| 10,612,112 B2 | 4/2020 | Yang et al. |
| 10,639,843 B2 | 5/2020 | Yuan et al. |
| 10,682,808 B2 | 6/2020 | Fujita et al. |
| 10,695,988 B2 | 6/2020 | Hanyu et al. |
| 10,717,212 B2 | 7/2020 | Parkinson et al. |
| 10,737,479 B2 | 8/2020 | El-Siblani et al. |
| 10,994,941 B1 | 5/2021 | Dwivedi et al. |
| 2002/0164069 A1 | 11/2002 | Nagano et al. |
| 2003/0180171 A1 | 9/2003 | Artz et al. |
| 2003/0209836 A1 | 11/2003 | Sherwood |
| 2005/0012239 A1 | 1/2005 | Nakashima |
| 2005/0019016 A1 | 1/2005 | Nakashika |
| 2005/0056677 A1 | 3/2005 | Talken |
| 2006/0230984 A1 | 10/2006 | Bredt et al. |
| 2006/0248062 A1 | 11/2006 | Libes et al. |
| 2007/0063366 A1 | 3/2007 | Cunningham et al. |
| 2007/0116937 A1 | 5/2007 | Lazzerini |
| 2008/0170112 A1 | 7/2008 | Hull et al. |
| 2008/0224352 A1 | 9/2008 | Narukawa et al. |
| 2008/0241404 A1 | 10/2008 | Allaman et al. |
| 2010/0003619 A1 | 1/2010 | Das et al. |
| 2010/0196694 A1 | 8/2010 | Yamazaki et al. |
| 2010/0290016 A1 | 11/2010 | Kaehr et al. |
| 2011/0089610 A1 | 4/2011 | El-Siblani et al. |
| 2011/0101570 A1 | 5/2011 | John et al. |
| 2011/0162989 A1 | 7/2011 | Ducker et al. |
| 2011/0207057 A1 | 8/2011 | Hull et al. |
| 2012/0195994 A1 | 8/2012 | El-Siblani et al. |
| 2012/0292800 A1 | 11/2012 | Higuchi et al. |
| 2013/0008879 A1 | 1/2013 | Bichsel |
| 2013/0140741 A1 | 6/2013 | El-Siblani et al. |
| 2014/0099476 A1 | 4/2014 | Subramanian et al. |
| 2014/0103581 A1 | 4/2014 | Das et al. |
| 2014/0200865 A1 | 7/2014 | Lehmann et al. |
| 2014/0239554 A1 | 8/2014 | El-Siblani et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2014/0332507 A1 | 11/2014 | Fockele |
| 2014/0339741 A1 | 11/2014 | Aghababaie et al. |
| 2014/0348691 A1 | 11/2014 | Ljungblad et al. |
| 2014/0348692 A1 | 11/2014 | Bessac et al. |
| 2015/0004042 A1 | 1/2015 | Nimal |
| 2015/0004046 A1 | 1/2015 | Graham et al. |
| 2015/0056365 A1 | 2/2015 | Miyoshi |
| 2015/0086409 A1 | 3/2015 | Hellestam |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0140155 A1 | 5/2015 | Ohno et al. |
| 2015/0145174 A1 | 5/2015 | Comb |
| 2015/0158111 A1 | 6/2015 | Schwarze et al. |
| 2015/0165695 A1 | 6/2015 | Chen et al. |
| 2015/0210013 A1 | 7/2015 | Teulet |
| 2015/0224710 A1 | 8/2015 | El-Siblani |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0251351 A1* | 9/2015 | Feygin ............... B33Y 30/00 |
| | | 156/267 |
| 2015/0268099 A1 | 9/2015 | Craig et al. |
| 2015/0298396 A1 | 10/2015 | Chen et al. |
| 2015/0301517 A1 | 10/2015 | Chen et al. |
| 2015/0306819 A1 | 10/2015 | Ljungblad |
| 2015/0306825 A1 | 10/2015 | Chen et al. |
| 2015/0321421 A1 | 11/2015 | Ding |
| 2015/0352668 A1 | 12/2015 | Scott et al. |
| 2015/0352791 A1 | 12/2015 | Chen et al. |
| 2015/0355553 A1 | 12/2015 | Allanic |
| 2015/0375452 A1 | 12/2015 | Huang et al. |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0067921 A1 | 3/2016 | Willis et al. |
| 2016/0082662 A1 | 3/2016 | Majer |
| 2016/0082671 A1 | 3/2016 | Joyce |
| 2016/0096332 A1 | 4/2016 | Chen et al. |
| 2016/0107340 A1 | 4/2016 | Joyce |
| 2016/0107383 A1 | 4/2016 | Dikovsky et al. |
| 2016/0107387 A1 | 4/2016 | Ooba et al. |
| 2016/0129631 A1 | 5/2016 | Chen et al. |
| 2016/0137839 A1 | 5/2016 | Rolland et al. |
| 2016/0167160 A1 | 6/2016 | Hellestam |
| 2016/0176114 A1 | 6/2016 | Tsai et al. |
| 2016/0184931 A1 | 6/2016 | Green |
| 2016/0193785 A1 | 7/2016 | Bell et al. |
| 2016/0214327 A1 | 7/2016 | Ucklemann et al. |
| 2016/0221262 A1 | 8/2016 | Das et al. |
| 2016/0243649 A1 | 8/2016 | Zheng et al. |
| 2016/0303798 A1 | 10/2016 | Mironets et al. |
| 2016/0332386 A1 | 11/2016 | Kuijpers |
| 2016/0361871 A1 | 12/2016 | Jeng et al. |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |

(56) References Cited

U.S. PATENT DOCUMENTS

| | | | |
|---|---|---|---|
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0162045 A1* | 6/2018 | Guimbretiere ........ B29C 64/321 |
| 2018/0169944 A1* | 6/2018 | Hofmann ............... B33Y 30/00 |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126548 A1 | 5/2019 | Barnhart et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0283316 A1 | 9/2019 | Rolland et al. |
| 2019/0344381 A1 | 11/2019 | Pomerantz et al. |
| 2019/0344498 A1* | 11/2019 | Klimczak ............. B29C 64/321 |
| 2019/0389137 A1 | 12/2019 | Frohnmaier et al. |
| 2020/0001398 A1* | 1/2020 | Mellor ................... B33Y 30/00 |
| 2020/0079008 A1 | 3/2020 | Chowdry et al. |
| 2020/0079017 A1 | 3/2020 | MacNeish, III et al. |
| 2020/0108553 A1 | 4/2020 | Rogren |
| 2020/0164437 A1 | 5/2020 | Goth et al. |
| 2020/0198224 A1 | 6/2020 | Dubelman et al. |
| 2020/0230938 A1 | 7/2020 | Menchik et al. |
| 2020/0247040 A1 | 8/2020 | Green |
| 2020/0290275 A1* | 9/2020 | Dubelman ............. B33Y 30/00 |
| 2020/0307075 A1 | 10/2020 | Mattes et al. |
| 2020/0376775 A1 | 12/2020 | Das et al. |
| 2021/0046695 A1* | 2/2021 | Thompson ............ B29C 64/245 |

FOREIGN PATENT DOCUMENTS

| | | |
|---|---|---|
| CN | 103522546 A | 1/2014 |
| CN | 104175559 A | 12/2014 |
| CN | 104647752 A | 5/2015 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| DE | 102007010624 A1 | 9/2008 |
| EP | 448459 A1 | 9/1991 |
| EP | 557051 A1 | 8/1993 |
| EP | 1454831 B1 | 9/2004 |
| EP | 1852244 A2 | 11/2007 |
| EP | 1864785 A1 | 12/2007 |
| EP | 1946908 A2 | 7/2008 |
| EP | 2521524 A1 | 11/2012 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | 2002370286 A | 12/2002 |
| JP | 2003039564 A | 2/2003 |
| JP | 2004/257929 A | 9/2004 |
| JP | 2016196098 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO0100390 A1 | 1/2001 |
| WO | WO2006/077665 A1 | 7/2006 |
| WO | WO2006109355 A1 | 10/2006 |
| WO | WO2017009368 A1 | 1/2017 |
| WO | WO2017098968 A1 | 6/2017 |
| WO | WO2017100538 A1 | 6/2017 |
| WO | WO2019/159936 A1 | 8/2019 |
| WO | WO2020033607 A1 | 2/2020 |
| WO | WO2020185553 A1 | 9/2020 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive-manufacturing-reinvented/.

Carbon, The 3D Printer for Products that Outperform, 8 Pages. Retrieved from Webpage: https://www.carbon3d.com.

DDM Systems, Disruptive Technologies for Additive Manufacturing, 2014. Retrieved on Jul. 7, 2020 from Web Link: http://www.ddmsys.com/.

Designing Buildings Wiki, Types of Brick Bonding, 6 Pages. Retrieved Mar. 25, 2021 from Webpage: https://www.designingbuildings.co.uk/wiki/Types_of_brick_bonding.

Doctor Blade with Micrometer Screw Gauge, The Tape Casting Warehouse, Inc., Morrisville PA, 6 Pages. Retrieved Mar. 23, 2021 from Webpage: https://www.drblade.com/.

Envisiontec, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.

Feng et al., Exposure Reciprocity Law in Photopolymerization of Multi-Functional Acrylates and Methacrylates, Macromolecular Chemistry and Physics, vol. 208, 2007, pp. 295-306.

Formlabs, An Introduction to Post-Curing SLA 3D Prints, 8 Pages. Retrieved from Webpage: https://formlabs.com/blog/introduction-post-curing-sla-3d-prints.

Formlabs, Form Wash & Form Cure, 8 Pages. Retrieved from Webpage: https://formlabs.com/tools/wash-cure/.

Hafkamp et al., A Feasibility Study on Process Monitoring and Control in Vat Photopolymerization of Ceramics, Mechatronics, vol. 56, The Netherlands, Dec. 2018, pp. 220-241. Retrieved from https://doi.org/10.1016/j.mechatronics.2018.02.006.

KUDO3D, Post-Process Your SLA Prints in 4 Easy Steps, 8 Pages. Retrieved from Webpage: https://www.kudo3d.com/post-process-your-sla-prints-in-4-easy-steps/.

Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.

(56) References Cited

OTHER PUBLICATIONS

Lee et al., Development of a 3D Printer Using Scanning Projection Stereolithography, Scientific Reports, vol. 5, Article No. 9875, 2015, 5 pages. https://www.nature.com/articles/srep09875#s1.

Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.

Limaye, Multi-Objective Process Planning Method for Mask Projection Stereolithography, Dissertation Georgia Institute of Technology, Dec. 2007, 324 Pages.

Lithoz, 2 Pages. Retrieved from Webpage: http://www.lithoz.com/en/our-products/cleaning-station.

Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.

MICRON3D, Cleaning of Printed Models, YouTube, Dec. 5, 2016, 1 Page. Retrieved from Webpage: https://www.youtube.com/watch?v=soAIrSsliBY.

Nussbaum et al., Evaluation of Processing Variables in Large Area Polymer Sintering of Single Layer Components, Solid Freeform Fabrication 2016: Proceedings of the $27^{th}$ Annual International Solid Freeform Fabracation Symposium-An Additive Manufacturing Conference Reviewed Paper, University of South Florida, Tampa Florida.

Omegasonics, Ultrasonic Cleaning of 3D Printer Parts, YouTube, Feb. 26, 2014, 1 Page. Retrieved from Webpage: https://www.youtube.com/watch?v=Gxj47OS5ohk.

Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.

Prodways Tech, Prodways Movinglight Technology Retrieved on Jul. 2, 2020 from Web Link: https://www.prodways.com/en/the-prodways-movinglight-technology/.

RAMCO Equipment Corporation, RAMCO RamTough-Fully Automated Wash/Rinse/Dry System, YouTube, Jul. 9, 2013, 1 Page. Retrieved from Webpage: https://www.youtube.com/watch?v=18850c3FVFU.

Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2/feature/02.html.

Sonics & Materials, Inc., Ultrasonic Food Cutting Equipment, Sonics & Materials, Inc., Retrieved on Jun. 26, 2020, 4 Pages. https://www.sonics.com/food-cutting.

Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.

Stevenson, Admatec's Ceramic 3D Printers, Ceramic, Metal, Fabbaloo 3D Printing News, Jan. 21, 2019, 8 Pages. Retrieved Nov. 24, 2020 from Weblink: https://www.fabbaloo.com/blog/2019/1/21/admatecs-ceramic-3d-printers.

Techmetals, Electroless Nickel (TM 117C), Engineered Metal Finishing & Performance Coatings, 1 Page. Retrieved from Webpage: https://techmetals.com/pdfs/TM_117C.pdf https://techmetals.com/tm117c-2/.

Telsonic Ultrasonics, Cutting Awning Fabrics and Sealing the Edge, The Powerhouse of Ultrasonics, 2017, 1 Page. https://www.telsonic.com/fileadmin/applications/AS_206_Cut_Seal_Markisengewebe_EN.pdf.

Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.

Tok et al., Tape Casting of High Dielectric Ceramic Substrates for Microelectronics Packaging, Journal of Materials Engineering and Performance, vol. 8, 1999, pp. 469-472. (Abstract Only) https://link.springer.com/article/10.1361/105994999770346783.

Wikipedia, Pixel Shifting, 2 Pages. Retrieved Mar. 30, 2021 from Webpage: https://en.wikipedia.org/wiki/Pixel_shifting.

Wikipedia, Standing Wave, 11 Pages. Retrieved Mar. 17, 2021 from Webpage: https://en.wikipedia.org/wiki/Standing_wave.

\* cited by examiner

ATTACHMENT STRUCTURE FOR ADDITIVE MANUFACTURING

FIELD

The present subject matter relates generally to an additive manufacturing apparatus, and more particularly to attachment structures for mounting various modules of the additive manufacturing apparatus relative to one another.

BACKGROUND

Additive manufacturing is a process in which material is built up layer-by-layer to form a component. Stereolithography (SLA) is a type of additive manufacturing process, which employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously-cured layer.

In some instances, additive manufacturing may be accomplished through a "tape casting" process. In this process, a resin is deposited onto a flexible radiotransparent resin support, such as tape or foil, that is fed out from a supply reel to a build zone. Radiant energy is used to cure the resin to a component that is supported by a stage in the build zone. Once the curing of the first layer is complete, the stage and the resin support are separated from one another. The resin support is then advanced and fresh resin is provided to the build zone. In turn, the first layer of the cured resin is placed onto the fresh resin and cured through the energy device to form an additional layer of the component. Subsequent layers are added to each previous layer until the component is completed.

In some instances, various components of the additive manufacturing apparatus may be provided as separate modules. Accordingly, it may be beneficial to develop an attachment structure for the various modules such that the modules may be aligned with one another.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
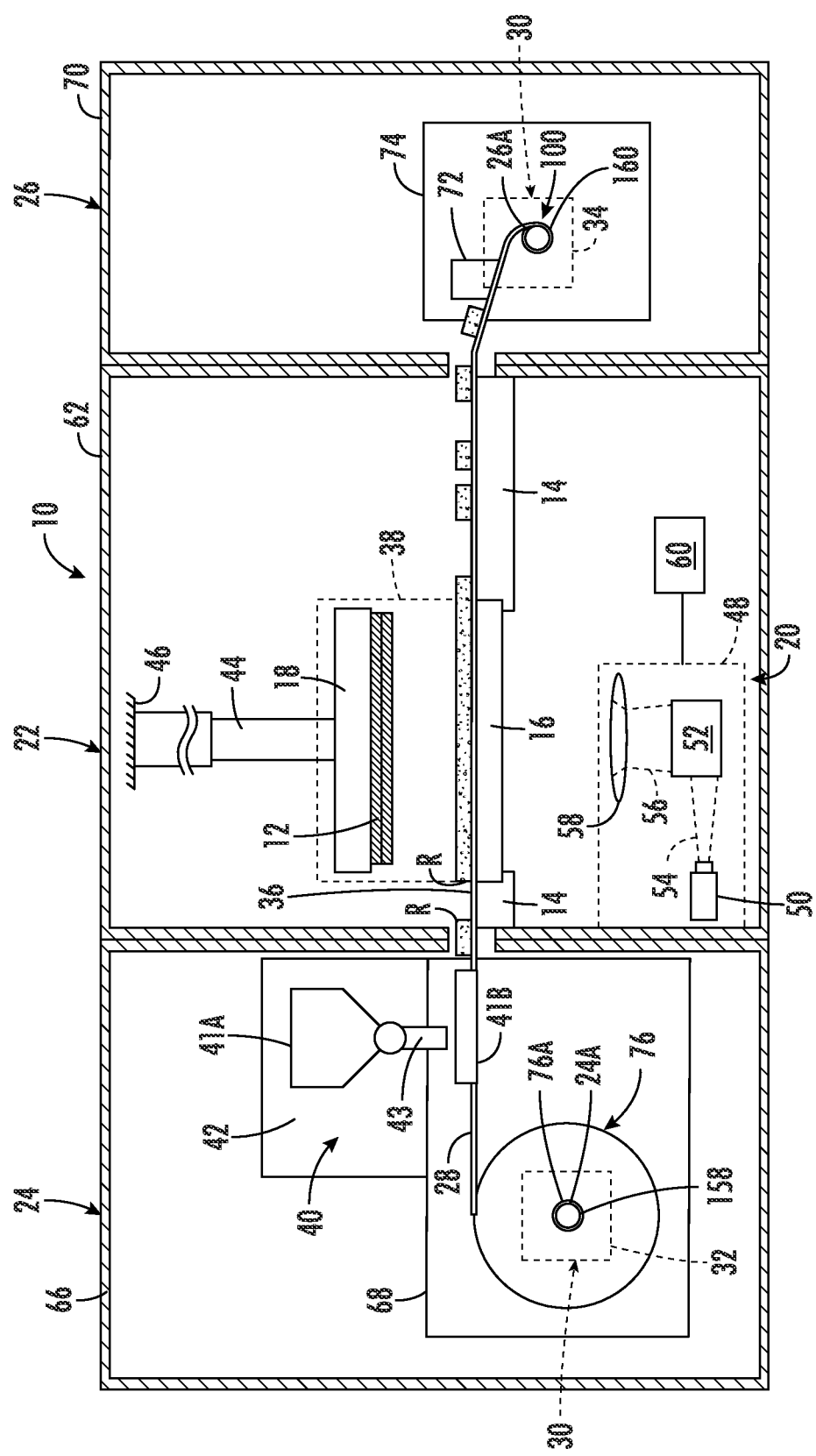
FIG. 1 is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify a location or importance of the individual components. Moreover, for purposes of convenience and clarity only, directional terms, such as top, bottom, left, right, up, down, over, above, below, beneath, rear, back, and front, may be used with respect to the accompanying drawings. These and similar directional terms should not be construed to limit the scope of the disclosure in any manner. Thus, it will be appreciated that the apparatus and/or any component described here may be oriented in one or more orientations that are rotationally offset from those illustrated without departing from the scope of the present disclosure.

The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a resin support movement along the manufacturing apparatus. For example, "upstream" refers to the direction from which the resin support moves, and "downstream" refers to the direction to which the resin support moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) (e.g., resins) are provided on each other to "build-up," layer-by-layer, a three-dimensional component. The successive layers generally cure together to form a monolithic component that may have a variety of integral sub-components. Although additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus can further include a flexible tape or resin support that supports a resin. The resin support, with the resin thereon, is positioned between the stage and the support plate. A radiant energy device is configured to cure a portion of the resin forming the component, which is translated towards and away from the resin support by the stage between successive curing operations.

In some instances, the stage may be positioned within a build module and may be supported on a build panel that is fixed within the build module in a predefined position.

A separable feed module may be operably coupled with the build module. The feed module can be configured to support a first portion of the resin support. The feed module may include a feed frame. A feed mounting panel may be affixed to the feed frame. One or more components of the feed module are supported by the feed mounting panel to ensure that each of the components is aligned in a predetermined position relative to the build module or a component of the build module.

A separable take-up module may also be operably coupled with the build module. The take-up module can be positioned on an opposing side of the radiant energy device from the feed module. The take-up module can be configured to support a second portion of the resin support. The take-up module may include a take-up frame. A take-up mounting panel may be affixed to the take-up frame. One or more components of the take-up module are supported by the take-up mounting panel to ensure each of the components is aligned with the feed module and/or the build module in a predefined manner. By aligning the various components, and consequently, the first and second portions of the resin support, various operational faults may be avoided and/or minimized.

Referring to the drawings wherein identical reference numerals denote the similar elements throughout the various views, FIG. 1 schematically illustrates an example of one type of suitable apparatus 10 for forming a component 12 created from one or more layers of resin R. The apparatus 10 can include one or more of a support plate 14, a window 16, a stage 18 that is movable relative to the window 16, and a radiant energy device 20, which, in combination, may be used to form any number (e.g., one or more) of additively manufactured components 12 within one or more build modules 22.

In the illustrated example, the apparatus 10 includes a feed module 24, which may include a feed mandrel 24A, and a take-up module 26, which may include a take-up mandrel 26A that are spaced-apart and configured to couple with respective end portions of a resin support 28, such as a flexible tape or foil or another type of the resin support 28 extending therebetween. A portion of the resin support 28 between the feed mandrel 24A and the take-up mandrel 26A can be supported from underneath by the support plate 14. Suitable mechanical supports (frames, brackets, etc.) may be provided for the mandrels 24A, 26A, and the support plate 14.

The feed mandrel 24A and/or the take-up mandrel 26A can be configured to control the speed and direction of the resin support 28 such that the desired tension and speed is maintained in the resin support 28 through a drive system 30. In various examples, the drive system 30 can be configured as individual first and second control devices 32, 34 respectively associated with the feed mandrel 24A and/or the take-up mandrel 26A. Moreover, the control devices 32, 34 may include various components, such as motors, actuators, feedback sensors, and/or controls can be provided for driving the mandrels 24A, 26A in such a manner so as to move at least a portion of the resin support 28 between the mandrels 24A, 26A.

In various embodiments, the window 16 is transparent and can be operably supported by the support plate 14. Further, the window 16 and the support plate 14 can be integrally formed such that one or more windows 16 are integrated within the support plate 14. Likewise, the resin support 28 is also transparent or includes portions that are transparent. As used herein, the terms "transparent" and "radiotransparent" refer to a material that allows at least a portion of radiant energy of a selected wavelength to pass through. For example, the radiant energy that passes through the window 16 and the resin support 28 can be in the ultraviolet spectrum, the infrared spectrum, the visible spectrum, or any other practicable radiant energy. Non-limiting examples of transparent materials include polymers, glass, and crystalline minerals, such as sapphire or quartz.

The resin support 28 extends between the feed module 24 and the take-up module 26 and defines a "resin surface" 36, which is shown as being planar, but could alternatively be arcuate. In some instances, the resin surface 36 may be defined by a first side of the resin support 28 and may be positioned to face the stage 18 with the window 16 on an opposing, second side of the resin support 28 from the stage 18. For purposes of convenient description, the resin surface 36 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the resin support 28. As used herein, the Y-axis refers to the transverse direction across the width of the resin support 28 and generally perpendicular to the machine direction. As used herein, the Z-axis refers to the stage direction that can be defined as the direction of movement of the stage 18 relative to the window 16.

The resin surface 36 may be configured to be "non-stick," that is, resistant to adhesion of a cured resin R. The non-stick properties may be embodied by a combination of variables such as the chemistry of the resin support 28, its surface finish, and/or applied coatings. For instance, a permanent or semi-permanent non-stick coating may be applied. One non-limiting example of a suitable coating is polytetrafluoroethylene ("PTFE"). In some examples, all or a portion of the resin surface 36 may incorporate a controlled roughness or surface texture (e.g. protrusions, dimples, grooves, ridges, etc.) with nonstick properties. Additionally or alternatively, the resin support 28 may be made in whole or in part from an oxygen-permeable material.

For reference purposes, an area or volume immediately surrounding the location of the resin support 28 and the window 16 or transparent portion defined by the support plate 14 may be defined as a "build zone," labeled 38.

In some instances, the apparatus 10 may further include a material deposition assembly 40 and/or a reclamation system 72. The material deposition assembly 40 may be any device or combination of devices that is operable to apply a layer of the resin R on the resin support 28. The material deposition assembly 40 may optionally include a device or combination of devices to define a height of the resin R on the resin support 28 and/or to level the resin R on the resin support 28. Nonlimiting examples of suitable material deposition assemblies include chutes, hoppers, pumps, spray nozzles, spray bars, or printheads (e.g. inkjets).

In the illustrated embodiment, the material deposition assembly 40 includes a vessel 41A and a reservoir 41B. A conduit 43 extends from the vessel 41A to direct resin from the vessel 41A to the reservoir 41B. The conduit 43 may be positioned along a bottom portion of the vessel 41A such that the resin R may be gravity fed from the vessel 41A to the conduit 43, which may generally prevent the introduction of air to the resin R as the air is transferred into and/or through the conduit 43. In some instances, a filter may be positioned upstream, downstream, and/or within the conduit 43 with respect to the flow of resin from the vessel 41A to the reservoir 41B. In such instances, the resin may be gravity fed through the filter prior to entering the reservoir 41B to catch various agglomerates, partially cured resin pieces, and/or other foreign objects that may affect the resin once it is thinned out on the resin support 28 or may affect the quality of the component 12.

The reservoir 41B may include any assembly to control the thickness of the resin R applied to the resin support 28, as the resin support 28 passes under and/or through the reservoir 41B. The reservoir 41B may be configured to maintain a first volume of the resin R and define a thickness of the resin R on the resin support 28 as the resin support 28 is translated in an X-axis direction. The vessel 41A may be positioned above the reservoir 41B in a Z-axis direction, or in any other position, and configured to store a second volume of the resin R. In various embodiments, when the first volume of the resin R deviates from a predefined range, additional resin R is supplied from the vessel 41A to the reservoir 41B.

In some embodiments, the reclamation system 72 may be configured to remove at least a portion of the resin R that remains on the resin support 28 after the resin support 28 is removed from a build zone 38. For example, the reclamation system 72 may include a wiper assembly, a blade assembly, and/or any other removal assembly.

The resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The uncured resin R may be provided in solid (e.g. granular) or liquid form, including a paste or slurry.

Furthermore, the resin R can have a relatively high viscosity fluid that will not "slump" or run off during the build process. The composition of the resin R may be selected as desired to suit a particular application. Mixtures of different compositions may be used. The resin R may be selected to have the ability to out-gas or burn off during further processing, such as a sintering process.

The resin R may incorporate a filler. The filler may be pre-mixed with the resin R, then loaded into the material deposition assembly 40. The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. The filler includes particles, which are conventionally defined as "a small bit of matter." For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon via application of sufficient energy. For example, fusibility is a characteristic of many available powders including, but not limited to, polymeric, ceramic, glass, and/or metallic materials. The proportion of filler to resin R may be selected to suit a particular application. Generally, any amount of filler may be used so long as the combined material is capable of flowing and being leveled, and there is sufficient resin R to hold together the particles of the filler in the cured state.

With further reference to FIG. 1, the stage 18 is capable of being oriented parallel to the resin surface 36. Various devices may be provided for moving the stage 18 relative to the window 16 parallel to the Z-axis direction. For example, as illustrated in FIG. 1, the movement may be provided through an actuator 44 operably coupled with a static anchor 46 and configured to change a relative position of the stage 18 relative to the radiant energy device 20, the support plate 14, the window 16, and/or any other static component of the apparatus 10. The actuator 44 may be configured as a ballscrew electric actuator, a linear electric actuator, a pneumatic cylinder, a hydraulic cylinder, a delta drive, or any other practicable device may additionally or alternatively be used for this purpose. In addition to, or as an alternative to, making the stage 18 movable, the resin support 28 could be movable parallel to the Z-axis direction.

The radiant energy device 20 may be configured as any device or combination of devices operable to generate and project radiant energy on the resin R in a suitable pattern and with a suitable energy level and other operating characteristics to cure the resin R during the build process. For example, as shown in FIG. 1, the radiant energy device 20 may include a projector 48, which may generally refer to any device operable to generate a radiant energy patterned image of suitable energy level and other operating characteristics to cure the resin R. As used herein, the term "patterned image" refers to a projection of radiant energy comprising an array of one or more individual pixels. Non-limiting examples of patterned imaged devices include a DLP projector or another digital micromirror device, a two-dimensional array of LEDs, a two-dimensional array of lasers, and/or optically addressed light valves. In the illustrated example, the projector 48 includes a radiant energy source 50 such as a UV lamp, an image forming apparatus 52 operable to receive a source beam 54 from the radiant energy source 50 and generate a patterned image 56 to be projected onto the surface of the resin R, and optionally focusing optics 58, such as one or more lenses.

The image forming apparatus 52 may include one or more mirrors, prisms, and/or lenses and is provided with suitable actuators, and arranged so that the source beam 54 from the radiant energy source 50 can be transformed into a pixelated image in an X-Y plane coincident with the surface of the resin R. In the illustrated example, the image forming apparatus 52 may be a digital micro-mirror device.

The projector 48 may incorporate additional components, such as actuators, mirrors, etc. configured to selectively move the image forming apparatus 52 or other part of the projector 48 with the effect of rastering or shifting the location of the patterned image on the resin surface 36. Stated another way, the patterned image may be moved away from a nominal or starting location.

In addition to other types of radiant energy devices 20, the radiant energy device 20 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 50 and a beam steering apparatus. The radiant energy source 50 may include any device operable to generate a beam of suitable power and other operating characteristics to cure the resin R. Non-limiting examples of suitable radiant energy sources 50 include lasers or electron beam guns.

The apparatus 10 may be operably coupled with a computing system 60. The computing system 60 in FIG. 1 is a generalized representation of the hardware and software that may be implemented to control the operation of the apparatus 10, including some or all of the stage 18, the radiant energy device 20, the actuator 44, and the various parts of the apparatus 10 described herein. The computing system 60 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

In some embodiments, one or more of the support plate 14, the window 16, the stage 18, and/or the radiant energy device 20, which, in combination, may be used to form the additively manufactured component 12, may be positioned within the build module 22. The build module 22 can include a build frame 62 supporting any one or more of the one or more of the support plate 14, the window 16, the stage 18, and/or the radiant energy device 20. Further, the feed module 24 can include a feed frame 66 that is capable of supporting any of the components provided therein, such as the feed mandrel 24A, which may be carried on a feed mounting panel 68, and/or the vessel 41A, which may be carried on the vessel panel 42. Similarly, the take-up module 26 may include a take-up frame 70 that is capable of supporting any of the components provided therein, such as the take-up mandrel 26A and/or a material reclamation system 72, either of which may be carried on a take-up mounting panel 74. The feed frame 66 and/or the take-up frame 70 may also support various components of the apparatus 10.

Figure 2A:
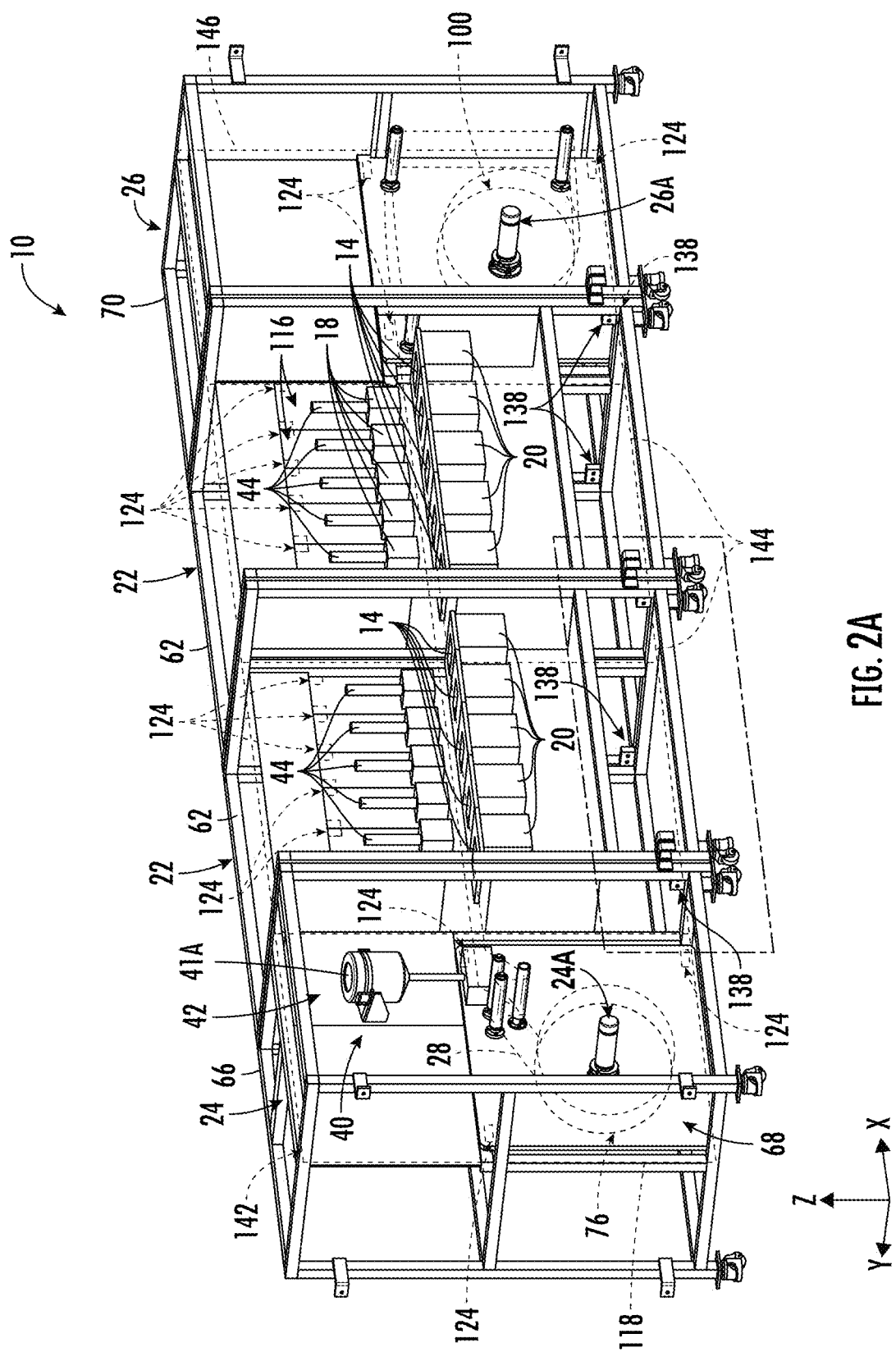
FIG. 2A is a front perspective view of the manufacturing apparatus in accordance with various aspects of the present disclosure.

Referring to FIG. 2A, a perspective view of the manufacturing apparatus 10 is provided in accordance with various exemplary embodiments of the present disclosure. As illustrated, the apparatus 10 includes a pair of build modules 22, the feed module 24, and a take-up module 26. It will be appreciated, however, that the apparatus 10 may include any number (e.g., one or more) of build modules 22. As will be described in greater detail below, each of the components within the build modules 22, the feed module 24, and a take-up module 26 may be anchored to various panels 42, 68, 74, 162 (FIG. 8) with the various panels 42, 68, 74, 162 being mounted to at least one of the feed frame 66, the build frame(s) 62, and/or the take-up frame. In addition, in various embodiments, an adjustment assembly may be configured to adjust a position of at least one of a feed mandrel 24A within the feed module 24 or a take-up mandrel 26A within the take-up module 26, which may assist in preventing foil translation issues due to misalignment of the feed mandrel 24A relative to the take-up mandrel 26A.

In some embodiments, the feed frame 66 may include one or more alignment pads 124 that may be attached to the feed frame 66 and/or integrally formed with various portions of the feed frame 66 that act as datums for coupling various components thereto. Similarly, the build frame 62 may include one or more alignment pads 124 that may be attached to the build frame 62 and/or integrally formed with various portions of the build frame 62 that act as datums for coupling various components thereto. Likewise, the take-up frame 70 may include one or more alignment pads 124 that may be attached to the take-up frame 70 and/or integrally formed with various portions of the take-up frame 70 that act as datums for coupling various components thereto.

In some instances, one or more panels within the feed module 24 may be operably coupled with the alignment pads 124. For example, a vessel panel 42 and/or a feed mounting panel 68 may be coupled with the feed module alignment pads 124. Similarly, one or more panels within the build module 22 may be operably coupled with the alignment pads 124. For example, one or more build panels 162 (FIG. 8) each supporting a print module 116 thereon may be coupled with the build module alignment pads 124. Likewise, one or more panels within the take-up module 26 may be operably coupled with the alignment pads 124. For example, a take-up mounting panel 74 may be coupled with the take-up module alignment pads 124. Each of the panels 42, 68, 74, 162 described herein may be formed from any practical material, such as, but not limited to, a metallic material, a composite material, a polymeric material, an elastomeric material, a combination thereof, and/or another material.

In various examples, coupling of the panels 42, 68, 74, 162 (FIG. 8) described herein to one of the feed frame 66, the build frame 62, and/or the take-up frame to define a mounting plane 142, 144, 146 of each respective module. In some embodiments, each of the mounting planes 142, 144, 146 are also aligned relative to one another to define an alignment plane 118. In some instances, the alignment plane 118 may be formed by each of the mounting planes 142, 144, 146 of the modules being positioned in a co-planar orientation, parallel, and/or otherwise aligned.

Figure 2B:
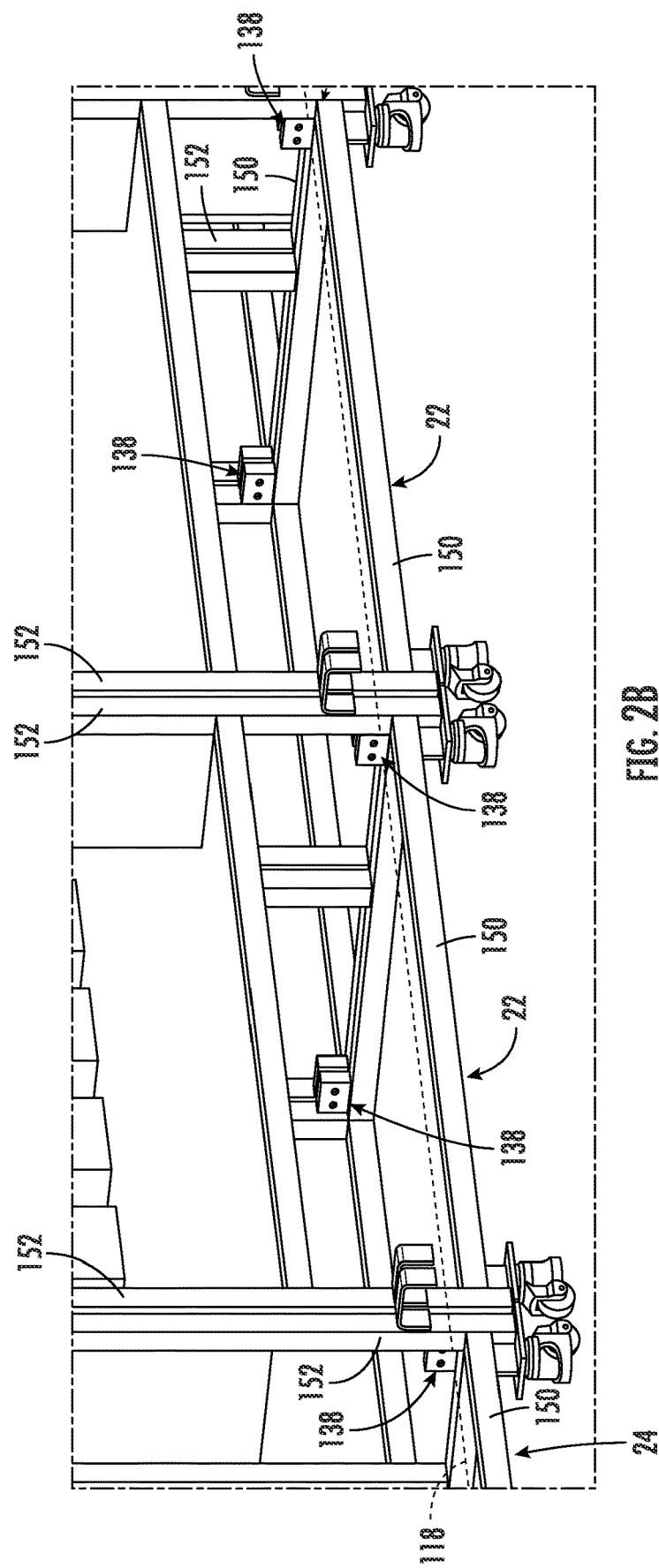
FIG. 2B is an enhanced view of section IIA of FIG. 2A.

With reference to FIGS. 2A and 2B, to align each of the modules relative to one another along the alignment plane 118, the build frame 62, the feed frame 66, and/or the take-up frame may each include one or more mounts 138 to drive higher functionality and alignment. For instance, each of the feed module 24, the one or more build modules 22, and the take-up module 26 include one or more mounts 138. The one or more mounts 138 may be used to align each of the feed frame 66, the one or more build frames 62, and the take-up frame 70 relative to one another.

In various embodiments, the build module 22 includes the build frame 62 having a first mount 138 operably coupled (e.g., welded) on a first side thereof and a second mount 138 operably coupled (e.g., welded) on a second side thereof. The feed module 24 includes the feed frame 66 having a third mount 138 operably coupled (e.g., welded) thereto. The take-up module 26 includes the take-up frame 70 having a fourth mount operably coupled (e.g., welded) thereto. In such examples, the first mount can be operably coupled with the third mount and the second mount can be operably coupled with the fourth mount.

In some examples, the first mount 138 and the second mount 138 are welded to the build frame 62 and machined in place to define a plane of respective outer surfaces of the first mount 138 and the second mount 138 relative to the build frame 62. Similarly, the third mount 138 is welded to the feed frame 66 and machined in place to define a plane of an outer surface of the third mount 138 relative to the feed frame 66. Likewise, the fourth mount 138 is welded to the take-up frame 70 and machined in place to define a plane of an outer surface of the fourth mount 138 relative to the take-up frame 70. As such, each of the mounts 138 may define a planar surface that aligns with another of the mounts 138 to ensure that the build frame 62, the feed frame 66, and the take-up frame 70 are generally aligned in a predefined orientation relative to one another.

In some embodiments, the mounts 138 may be positioned such that each of the mounts 138 is coupled with a pair of frame elements of the respective frame, which in the illustrated embodiment in FIGS. 2A and 2B, is a bottom frame element 150 and a vertically extending frame element 152. However, it will be appreciated that the mounts 138 may be positioned in any other location without departing from the scope of the present disclosure.

As illustrated, the mounts 138 may be configured to extend generally in a first direction (e.g., in the Y-axis direction in FIG. 2A) while the various panels 42, 68, 74, 162 (FIG. 8) of the apparatus 10 may extend in a second, offset direction (e.g., in the X-axis direction in FIG. 2A). In some examples, such as the those illustrated in FIGS. 2A, the first and second directions may be perpendicular to one another.

Figure 3:
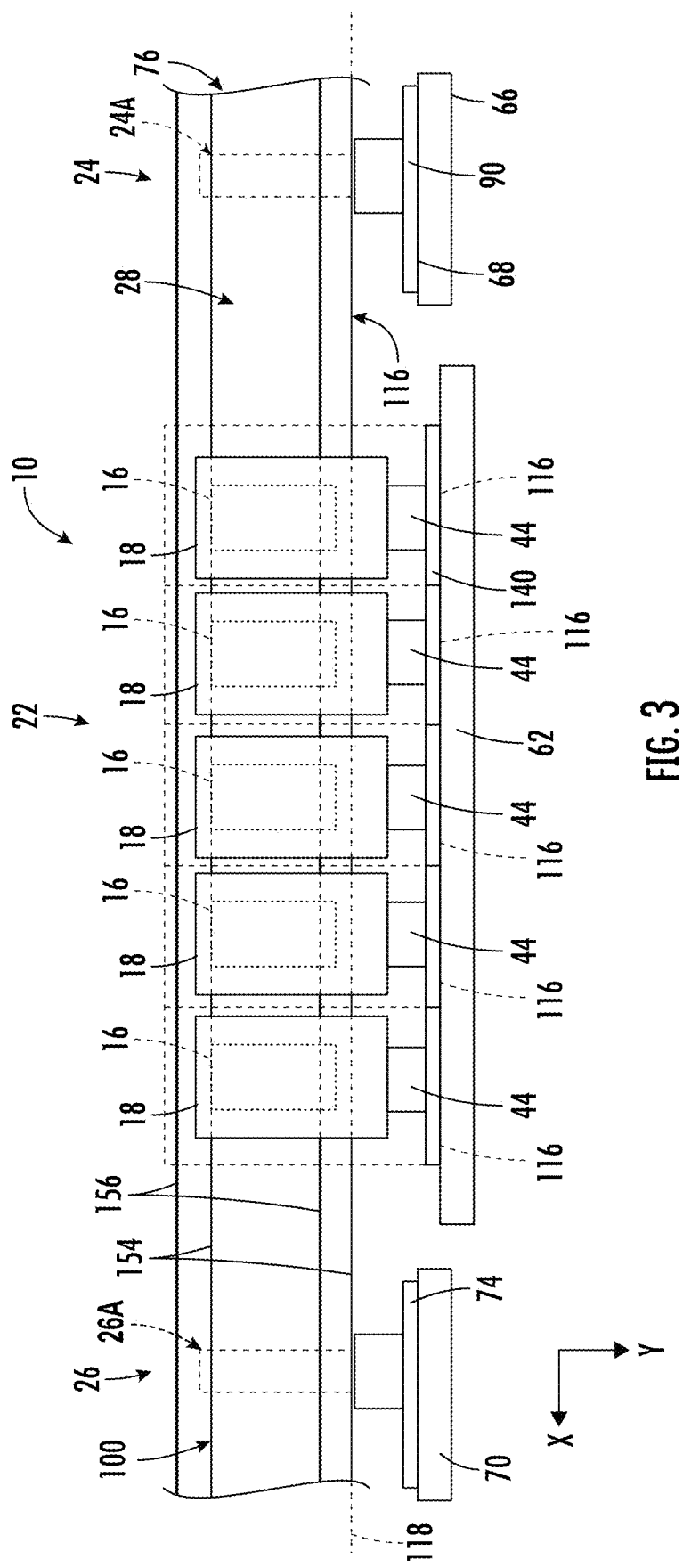
FIG. 3 is a top schematic view of a plurality of print modules positioned within a build module in accordance with various aspects of the present disclosure.

With reference to FIG. 3, in various embodiments, the build module 22 may include one or more print modules 116. Each print module 116 may include a support plate 14, a window 16, a stage 18, an actuator 44, and/or a radiant energy device 20. As generally illustrated in FIG. 3, the resin support 28 may be maintained in a position in which the resin support 28 generally extends through each print module 116 and covers the one or more windows 16 of the print modules 116. Moreover, the mounts 138 may allow for the resin support 28 to be aligned such that the resin support 28 remains in its original position 154 rather than sliding to a misalignment position 156 in the Y-axis direction during operation, which may occur when one or more components are misaligned and/or the feed mandrel 24A and the take-up mandrel 26A have non-parallel axes of rotation.

Figure 4:
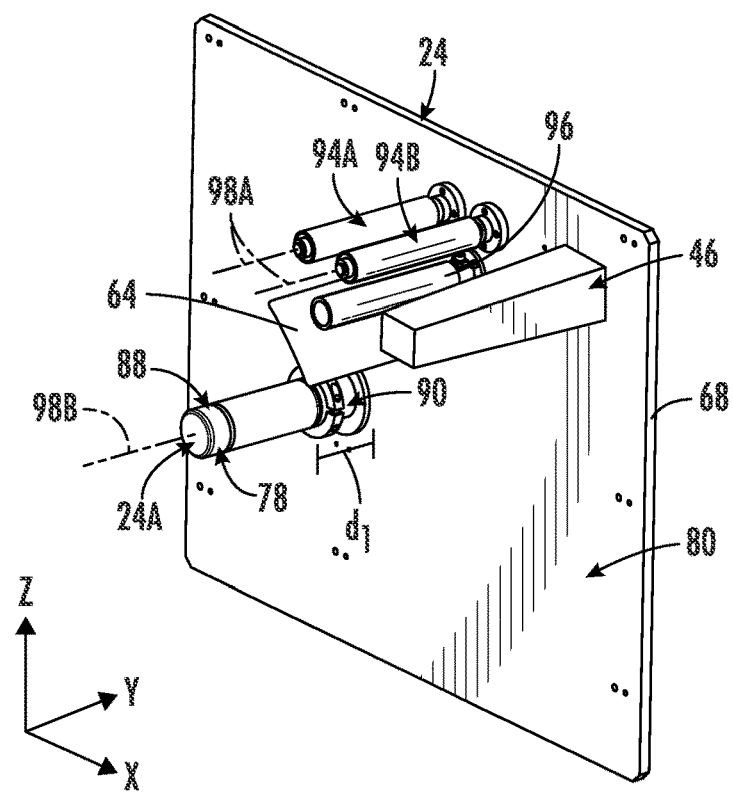
FIG. 4 is a front perspective view of a feed mounting panel configured to support one or more components of a feed module in accordance with various aspects of the present disclosure.
Figure 5:
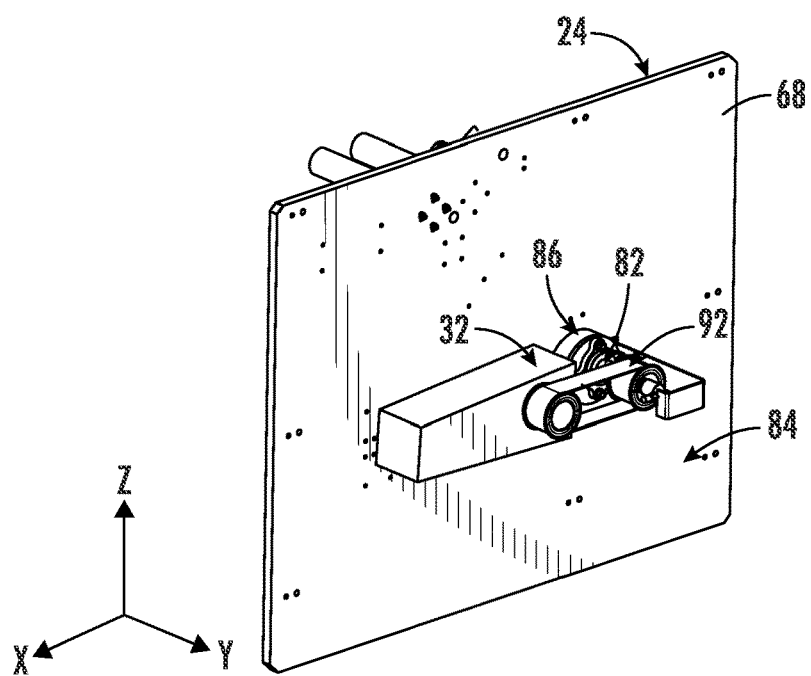
FIG. 5 is a rear perspective view of the feed mounting panel of the feed module in accordance with various aspects of the present disclosure.

Referring to FIGS. 4 and 5, exemplary perspective views of the feed mounting panel 68 are illustrated in accordance with exemplary embodiments of the present disclosure. As illustrated, the feed mandrel 24A can be anchored to the feed mounting panel 68 and may support and rotate a first portion 76 (FIG. 1) of the resin support 28 (FIG. 1). In various embodiments, the feed mandrel 24A includes a front portion 78 on a first side 80 of the feed mounting panel 68 and a rear portion 82 on a second, opposing side 84 of the feed mounting panel 68. In some instances, a bearing 86 may be positioned along the front portion 78, the rear portion 82, and/or between the front and rear portions 78, 82.

The front portion 78 of the feed mandrel 24A may include a cylindrical portion 88 that is configured to accept the first portion 76 of the resin support 28 thereabout. In various instances, the resin support 28 may be operably coupled to a feed spool 158 (FIG. 1) (e.g., cardboard spool, polymeric spool, metallic spool, paper-based spool, etc.), and the feed spool 158 may be positioned about the feed mandrel 24A.

A stop 90 may be positioned between the cylindrical portion 88 and the feed mounting panel 68. As such, when the resin support 28 is positioned about the feed mandrel 24A, the stop 90 defines a first distance $d_1$ between an inner edge of the feed spool 158 and the feed mounting panel 68. In some examples, the feed mandrel 24A may be configured to move between a disengaged position and an engaged position. In operation, the feed mandrel 24A may be placed in the disengaged position to allow the feed spool 158, and the resin support 28 wound thereabout, to be slid along the feed mandrel 24A to a position in which an end portion of the feed spool 158 is in contact or close proximity to the stop 90. Once the feed spool 158 is positioned about the feed mandrel 24A, the feed mandrel 24A may be placed in the engaged position causing the feed spool 158, and, consequently, the first portion 76 of the resin support 28 to rotate with the feed mandrel 24A.

In some embodiments, the drive system 30 (FIG. 1) may include a first control device 32 operably coupled with the rear portion 82 of the feed mandrel 24A. The first control device 32 may be configured as one or more motors, actuators, or any other device that may rotate the feed mandrel 24A. Further, as illustrated in FIG. 5, the first control device 32 may include a transmission 92 in the form of a belt system, a gear system, and/or any other practicable system.

With further reference to FIGS. 4 and 5, one or more rollers 94A, 94B, and/or a tension sensor 96, such as a load cell, may be anchored to the first side 80 of the feed mounting panel 68. For example, a pair of rollers 94A, 94B may be positioned above the feed mandrel 24A in the Z-axis direction. In some instances, the pair of rollers 94A, 94B may have an axis of rotation 98A that is generally parallel to an axis of rotation 98B of the feed mandrel 24A.

The tension sensor 96 may be positioned between the pair of rollers 94A, 94B and the feed mandrel 24A in the Z-axis direction. The tension sensor 96 may be configured as a force transducer that converts a tension or torque provided by the resin support 28 onto the tension sensor 96 into an electrical signal that can be measured by the computing system 60 to determine a tension of the resin support 28. In some embodiments, the resin support 28 may be provided from the feed mandrel 24A around a first roller 94A, around the tension sensor 96, and around a second roller 94B.

As illustrated in FIG. 4, a cover 64 may be anchored to the first side 80 of the feed mounting panel 68. In various instances, the cover 64 may be configured to prevent any resin that might drip from dripping onto the first portion 76 (FIG. 1) of the resin support 28 and/or any other component of the apparatus 10. Additionally or alternatively, the cover 64 may also prevent damage to various components of the apparatus 10 while loading the first portion 76 (FIG. 1) of the resin support 28 onto and/or off of the apparatus 10.

Figure 6:
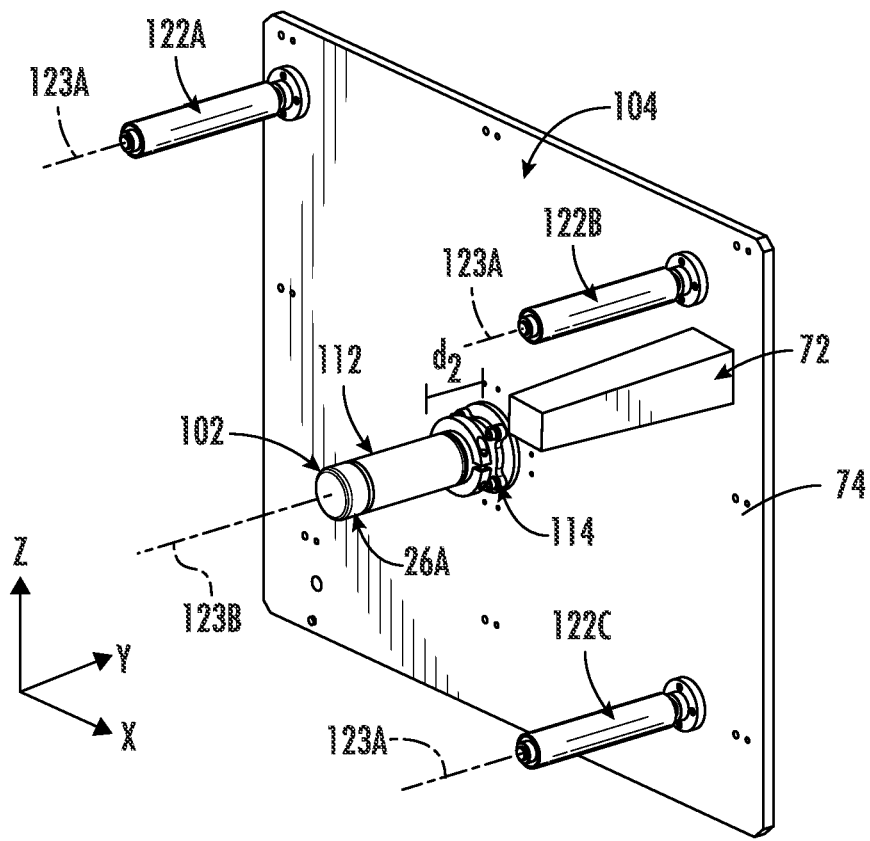
FIG. 6 is a front perspective view of a take-up mounting panel configured to support one or more components of a take-up module in accordance with various aspects of the present disclosure.
Figure 7:
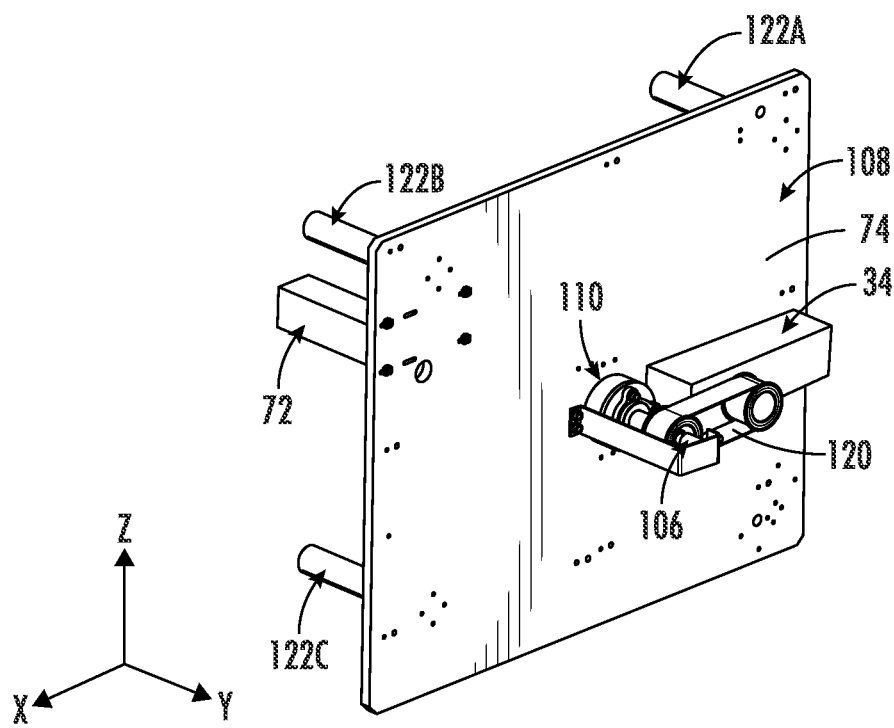
FIG. 7 is a rear perspective view of the take-up mounting panel of the take-up module in accordance with various aspects of the present disclosure.

Referring to FIGS. 6 and 7, respective front and rear perspective views of the take-up mounting panel 74 are illustrated in accordance with exemplary embodiments of the present disclosure. As illustrated, the take-up mounting panel 74 may define a generally planar front surface. The take-up mandrel 26A may be anchored to the take-up mounting panel 74 and configured to support a second portion 100 (FIG. 1) of the resin support 28.

In various embodiments, the take-up mandrel 26A includes a front portion 102 on a first side 104 of the take-up mounting panel 74 and a rear portion 106 on a second, opposing side 108 of the take-up mounting panel 74. In some instances, a bearing 110 may be positioned along the front portion 102, the rear portion 106, and/or between the first and second portions 102, 106 of the take-up mandrel 26A.

The front portion 102 of the take-up mandrel 26A may include a cylindrical portion 112 that is configured to accept the second portion 100 of the resin support 28 thereabout. In various instances, the resin support 28 may be operably coupled to a take-up spool 160 (FIG. 1) (e.g., cardboard spool, polymeric spool, paper-based spool, etc.), and the take-up spool 160 may be positioned about the take-up mandrel 26A.

A stop 114 may be positioned between the cylindrical portion 112 and the take-up mounting panel 74. As such, the resin support 28 is wrapped about the feed mandrel 24A, the stop 114 defines a second distance $d_2$ between the inner edge of the take-up spool 160 and the take-up mounting panel 74. In some examples, the take-up mandrel 26A may be configured to move between a disengaged position and an engaged position. In operation, the take-up mandrel 26A may be placed in the disengaged position to allow the take-up spool 160 to be slid along the take-up mandrel 26A to a position in which an end portion of the take-up spool 160 is in contact or close proximity to the stop 114. Once the take-up spool 160 is positioned about the take-up mandrel 26A, the take-up mandrel 26A may be placed in the engaged position causing the take-up spool 160, and, consequently, the second portion 100 of the resin support 28 to rotate with the take-up mandrel 26A.

In some examples, once the vessel panel 42 and/or the feed mounting panel 68 are coupled to the feed frame, the one or more build panels 162 are mounted to the build frame 62, and/or the take-up mounting panel 74 is coupled to the take-up frame 70, the stop 90 of the feed module and/or the stop 114 of the take-up module may be adjusted to alter a position of the foil.

Similar to the feed module 24, the second control device 34 may be operably coupled with the rear portion 106 of the feed mandrel 24A. The second control device 34 may be configured as one or more motors, actuators, or any other device that may rotate the feed mandrel 24A. Further, as illustrated in FIG. 6, the second control device 34 may include a transmission 120 in the form of a belt system, a gear system, and/or any other practicable system. Moreover, the first control device 32 and the second control device 34 may be operably coupled with feedback sensors and/or controls that can be provided for driving the mandrels 24A, 26A in such a manner so as to maintain the resin support 28 tensioned between the mandrels 24A, 26A and to wind the resin support 28 from the feed mandrel 24A to the take-up mandrel 26A.

With further reference to FIGS. 5 and 6, one or more rollers may be anchored to the first side 104 of the take-up mounting panel 74. For example, a set of three rollers 122A, 122B, 122C may be positioned on various portions of the take-up mounting panel 74. In some instances, each roller 122A, 122B, 122C may have an axis of rotation 123A that is generally parallel to an axis of rotation 123B of the take-up mandrel 26A.

Figure 8:
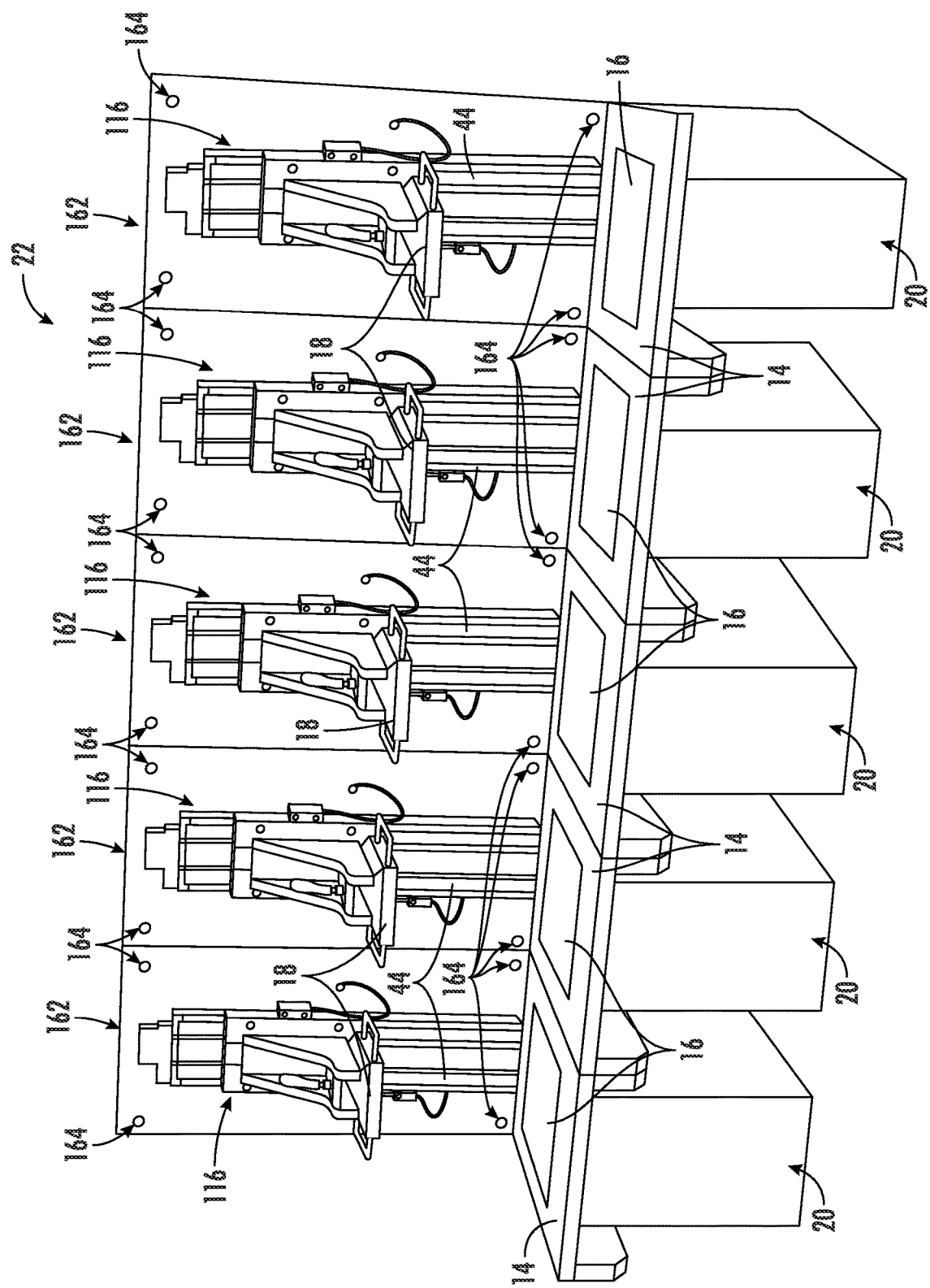
FIG. 8 is a front perspective view of a plurality of build panels of the build module in accordance with various aspects of the present disclosure.

Referring to FIG. 8, the build module 22 may include any number (e.g., one or more) of print modules 116 may each be used to form an additively manufactured component 12 (FIG. 1). Each print module 116 may include a support plate 14, a window 16, a stage 18, an actuator 44, and/or a radiant energy device 20. In addition, each print module 116 may be coupled to individual build panels 162, which may aid in assembly and manufacturing, as well as in serviceability. As illustrated, the print modules 116 may be placed in an upstream/downstream orientation such that the resin support 28 translates between each subsequent print module 116 as the resin support 28 is moved from the feed module 24 to the take-up module 26.

With further reference to FIG. 8, each of the build panels 162 may define a plurality of attachment locations 164. The attachment locations 164 are configured to align with respective alignment pads 124 to attach each respective build panel 162 to the build frame 62.

Figure 9:
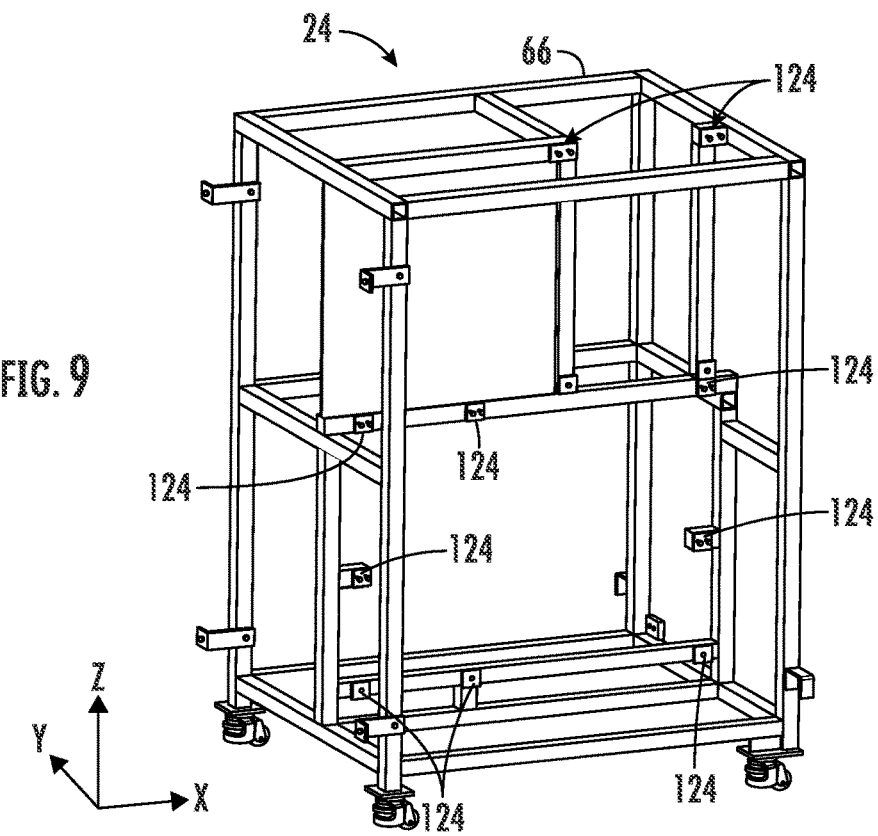
FIG. 9 is a front perspective view of a feed frame of the feed module in accordance with various aspects of the present disclosure.
Figure 10:
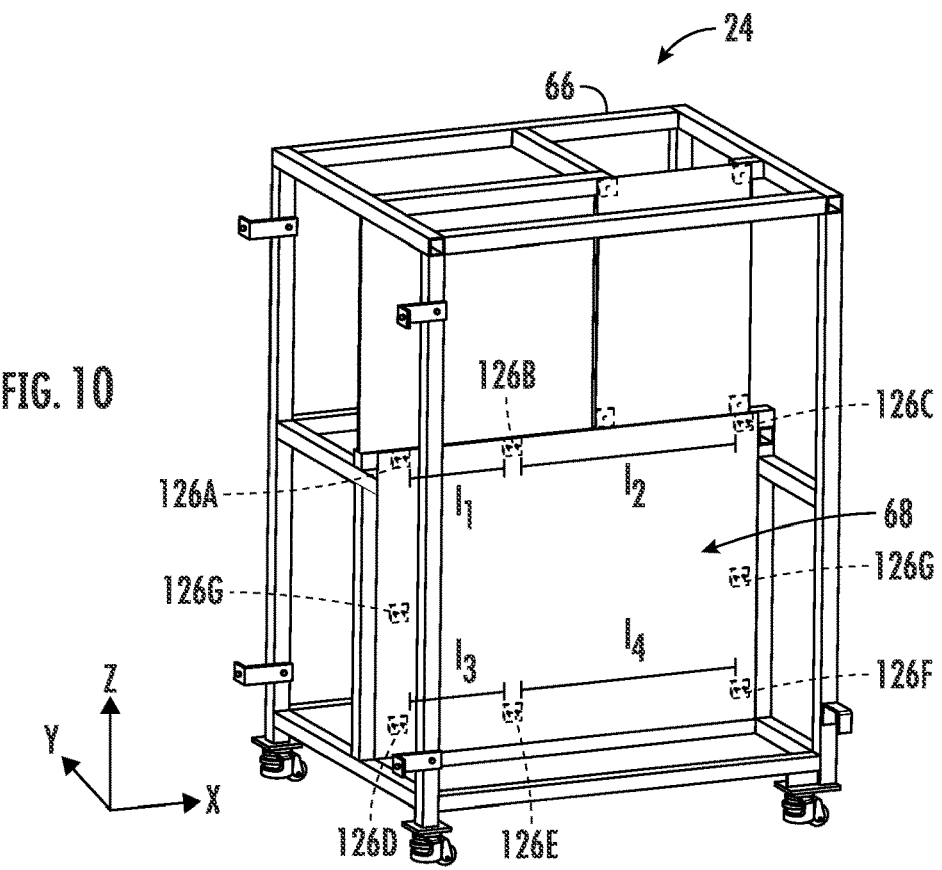
FIG. 10 is a front perspective view of the feed frame operably coupled with the feed mounting panel in accordance with various aspects of the present disclosure.

Referring to FIGS. 9 and 10, exemplary perspective views of the feed module 24 are illustrated in accordance with exemplary embodiments of the present disclosure. In the illustrated embodiments, the feed frame 66 may include one or more alignment pads 124 that may be attached to the feed frame 66 and/or integrally formed with various portions of the feed frame 66. The alignment pads 124 can act as datums to align the feed mounting panel 68 with a defined position relative to the feed frame 66, which, in turn, may align the first portion 76 (FIG. 1) of the resin support 28 within the feed module 24 (FIG. 1) to various components of the apparatus 10.

As illustrated, the feed mounting panel 68 may define attachment locations 126 for attaching the feed mounting panel 68 to the feed frame 66 through alignment with the alignment pads 124. In some embodiments, the feed mounting panel 68 may include at least a distal upper location 126A, an intermediate upper location 126B, and a proximal upper location 126C. In some instances, the distal upper location 126A and the intermediate upper location 126B may be separated by a first length $l_1$. Further, the intermediate upper 126B location and the proximal upper location 126C may be separated by a second length $l_2$. In various embodiments, the first and second lengths $l_1$, $l_2$ may be different from one another, which may provide a poka-yoke (or error-proofed) design for assembly. Additionally or alternatively, the alignment pads 124 may also provide for a more rigid structure to keep the weight of the resin support 28 from causing deflection in the feed mounting panel 68. To this end, various attachment locations (e.g., 126B, 126E) may be positioned on opposing sides of the feed mandrel 24A of the feed module 24.

In some embodiments, the feed mounting panel 68 may further include at least a distal lower location 126D, an intermediate lower location 126E, and a proximal lower location 126F. In some instances, the distal lower location 126D and the intermediate lower location 126E may be separated by a third length $l_3$. Further, the intermediate lower location 126E and the proximal lower location 126F may be separated by a fourth length $l_4$. In various embodiments, the third and fourth lengths $l_3$, $l_4$ may be different from one another.

Further still, the feed mounting panel 68 may additionally or alternatively each include additional attachment locations 126G generally between the distal upper location 126A and the distal lower locations 126D and/or between the proximal upper location 126C and the proximal lower locations 126F. It will be appreciated, however, that the feed module 24 may include any number of attachment locations 126 without departing from the scope of the present disclosure.

Figure 11:
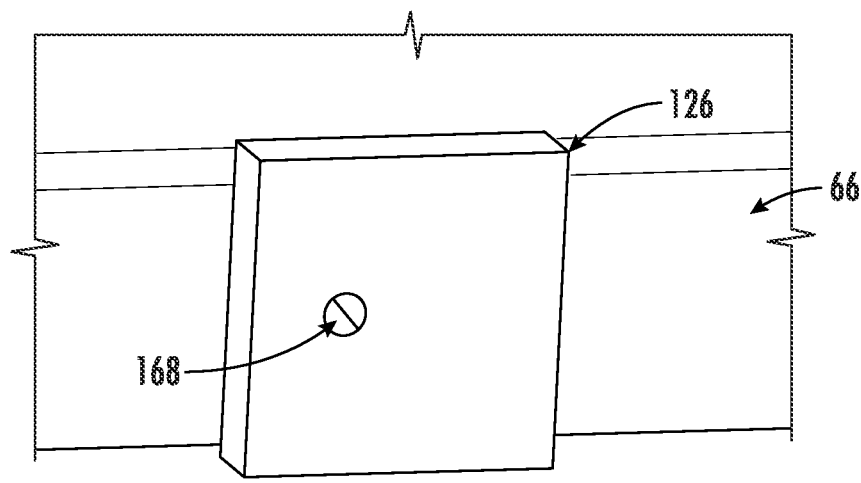
FIG. 11 is a front perspective view of an alignment pad of the feed frame in accordance with various aspects of the present disclosure.
Figure 11:
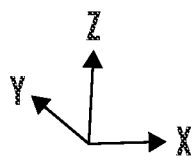
Figure 12:
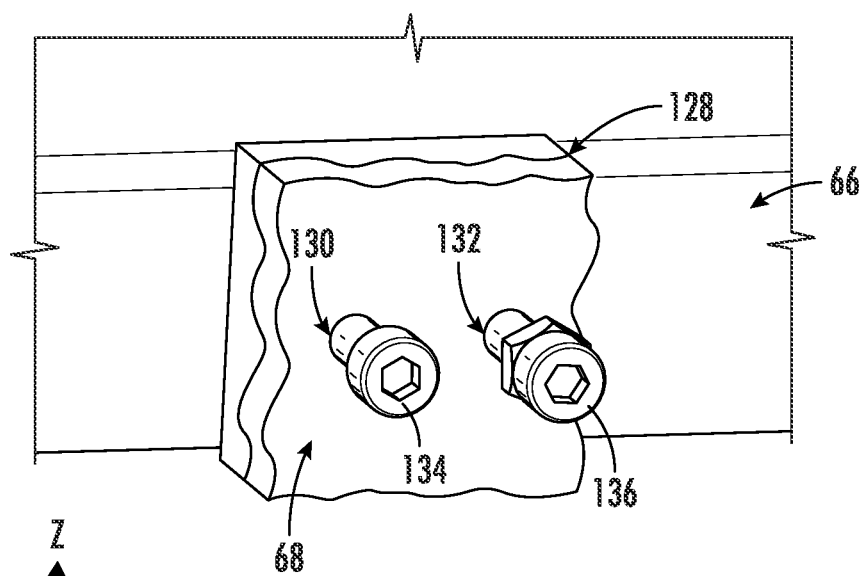
FIG. 12 is a front perspective view of an attachment location of the feed mounting panel in accordance with various aspects of the present disclosure.
Figure 12:
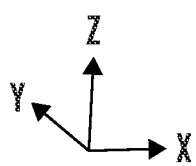

Referring to FIGS. 11 and 12, front perspective views of an alignment pad 121 of the feed module 24 and an attachment location 126 of the feed mounting panel 68 are illustrated in accordance with various exemplary embodiments of the present disclosure. In some embodiments, the alignment pads 124 may define an attachment void 168 that may be offset on the alignment pad in the X-axis and/or Z-axis direction. The feed mounting panel 68 can define first and second apertures 130, 132. In several embodiments, a coupling fastener 134 can be positioned in the first aperture 130 and into the attachment void 168 of the alignment pad. The coupling fastener 134 can be a mounting bolt that is configured to removably anchor the feed mounting panel 68 to the feed frame 66. An adjustment fastener 136 can be positioned through the second aperture 132 and contact and/or press against the alignment pad. As such, the adjustment fastener 136 can be an adjustment screw (e.g., a jack screw) that is configured to allow for fine adjustment of the feed mounting panel 68 relative to the feed frame 66.

Figure 13:
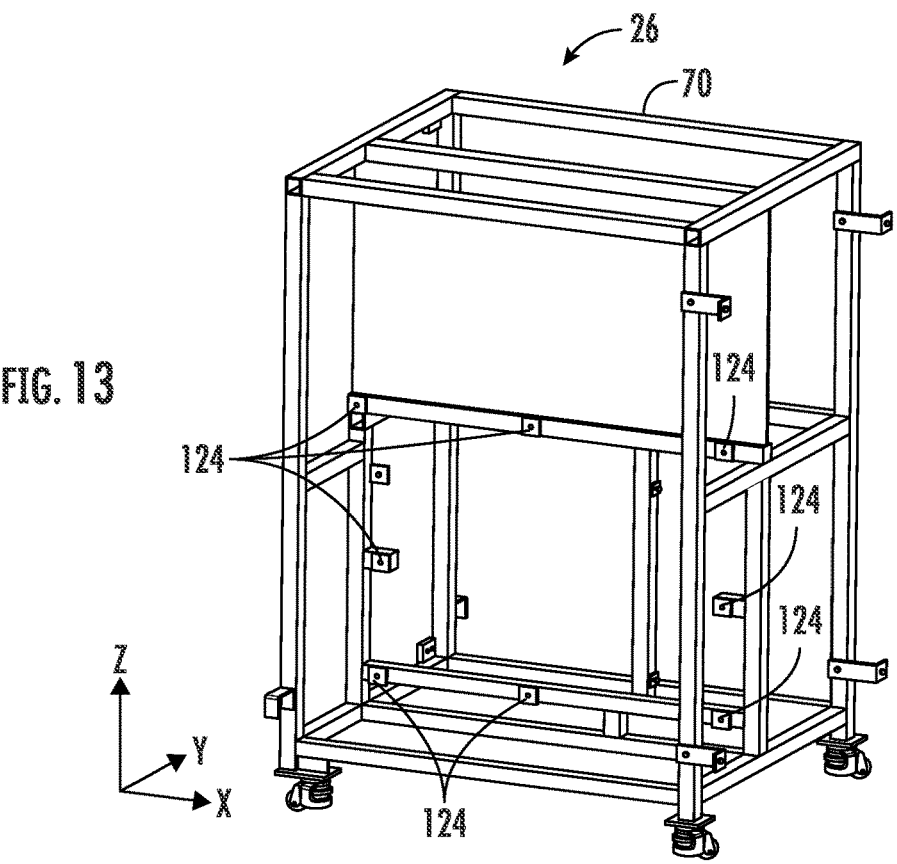
FIG. 13 is a front perspective view of a take-up frame of the take-up module in accordance with various aspects of the present disclosure.
Figure 14:
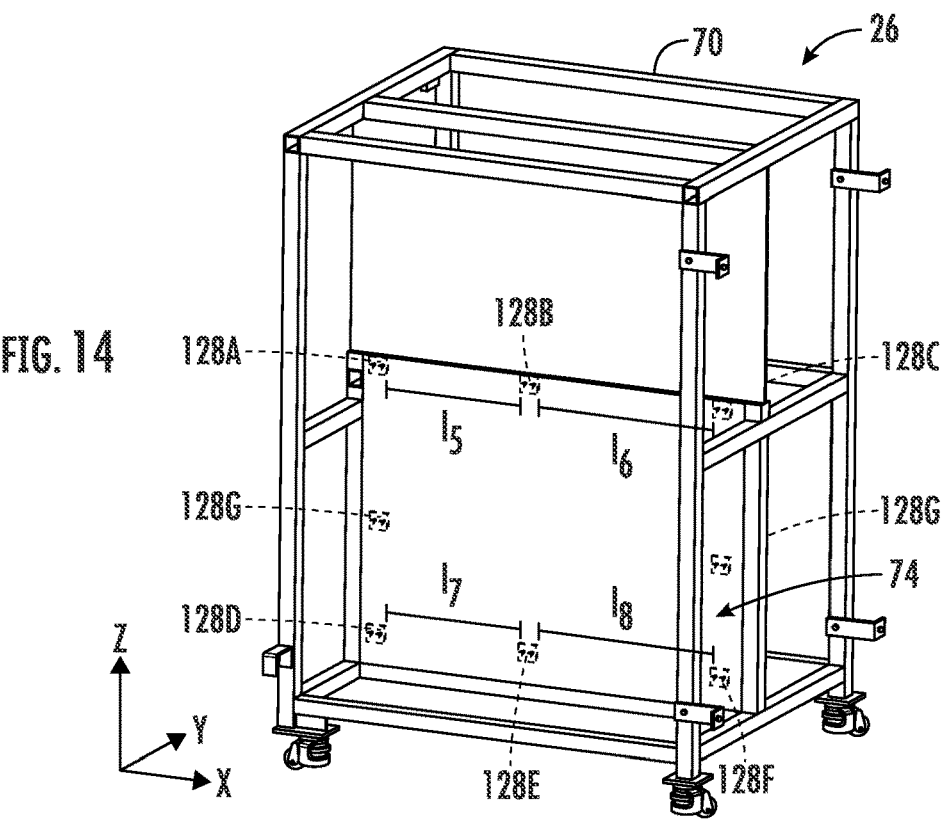
FIG. 14 is a front perspective view of the take-up frame operably coupled with the take-up mounting panel in accordance with various aspects of the present disclosure.

Referring to FIGS. 13 and 14, exemplary perspective views of the take-up frame 70 are illustrated in accordance with exemplary embodiments of the present disclosure. In the illustrated embodiments, the take-up frame 70 may include one or more alignment pads 124 that may be attached to the take-up frame 70 and/or integrally formed with various portions of the take-up frame 70. The alignment pads 124 can act as datums to align the take-up mounting panel 74 with a defined position relative to the take-up frame 70, which, in turn, may align the first portion 76 of the resin support 28 within the take-up module 26 to various components of the apparatus 10.

In some embodiments, the take-up mounting panel 74 may include at least a distal upper location 128A, an intermediate upper location 128B, and a proximal upper location 128C. In some instances, the distal upper location 128A and the intermediate upper location 128B may be separated by a fifth length $l_5$. Further, the intermediate upper location 128B and the proximal upper location 128C may be separated by a sixth length $l_6$. In various embodiments, the fifth and sixth lengths $l_5$, $l_6$ may be different from one another, which may provide a poka-yoke design. Moreover, the first and fifth lengths $l_1$, $l_5$ may be generally equal or different from one another, the first and sixth lengths $l_1$, $l_6$ may be generally equal or different from one another, the second and fifth lengths $l_2$, $l_5$ may be generally equal or different from one another, and/or the second and sixth $l_2$, $l_6$ lengths may be generally equal or different from one another.

In various embodiments, the take-up mounting panel 74 may include at least a distal lower location 128D, an intermediate lower location 128E, and a proximal lower location 128F. In some instances, the distal lower location 128D and the intermediate lower location 128E may be separated by a seventh length $l_7$. Further, the intermediate lower location 128E and the proximal lower location 128F may be separated by an eighth length $l_8$. In various embodiments, the seventh and eighth lengths $l_7$, $l_8$ may be different from one another. Moreover, the third and seventh lengths $l_3$, $l_7$ may be generally equal or different from one another, the third and eighth lengths $l_3$, $l_8$ may be generally equal or different from one another, the fourth and seventh lengths $l_4$, $l_7$ may be generally equal or different from one another, and/or the fourth and eighth lengths $l_4$, $l_8$ may be generally equal or different from one another.

Further still, the take-up mounting panel 74 may additionally or alternatively include additional attachment locations 128G generally between the distal upper location 128A and the distal lower locations 128D and/or between the proximal upper location 128C and the proximal lower locations 128F. It will be appreciated, however, that the take-up module 26 may include any number of attachment locations 128 without departing from the scope of the present disclosure.

Figure 15:
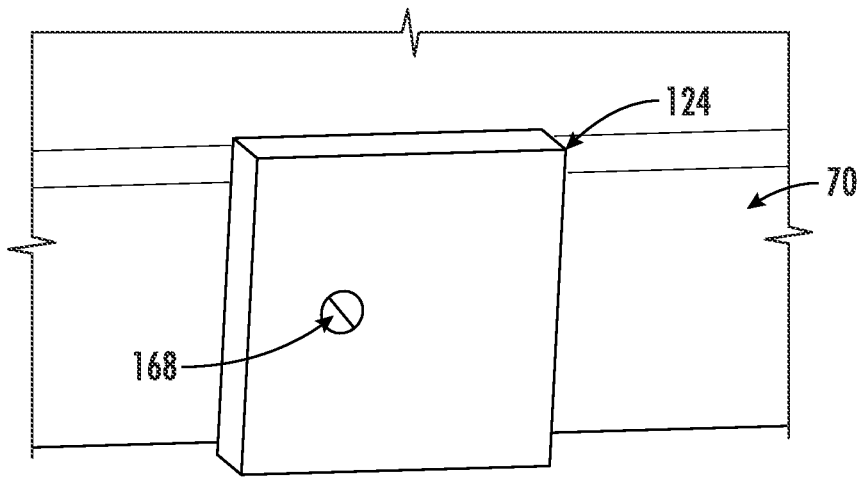
FIG. 15 is a front perspective view of an alignment pad of the take-up frame in accordance with various aspects of the present disclosure.
Figure 16:
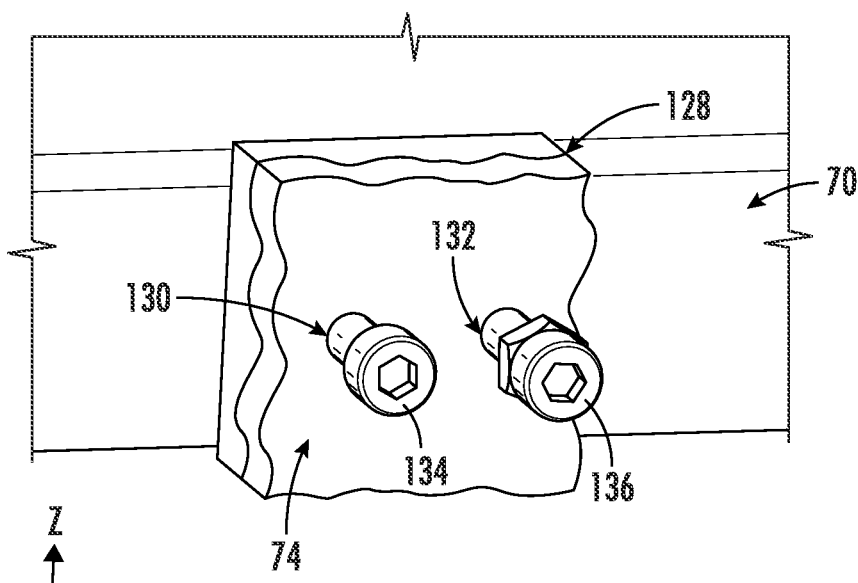
FIG. 16 is a front perspective view of an attachment location of the take-up mounting panel in accordance with various aspects of the present disclosure.

Referring to FIGS. 15 and 16, front perspective views of an alignment pad of the take-up module 26 and an attachment location 128 of the take-up mounting panel 74 are illustrated in accordance with various exemplary embodiments of the present disclosure. In some embodiments, the alignment pads 124 may define an attachment void 168 that may be offset on the alignment pad. The take-up mounting panel 74 can define first and second apertures 130, 132. In several embodiments, a coupling fastener 134 can be positioned in the first aperture 130 and into the attachment void 168 of the alignment pad. The coupling fastener 134 can be a mounting bolt that is configured to removably anchor the take-up mounting panel 74 to the take-up frame 70. An adjustment fastener 136 can be positioned through the second aperture 132 and contact and/or press against the alignment pad. As such, the adjustment fastener 136 can be an adjustment screw (e.g., a jack screw) that is configured to allow for adjustment of the take-up mounting panel 74 relative to the take-up frame 70.

Figure 17:
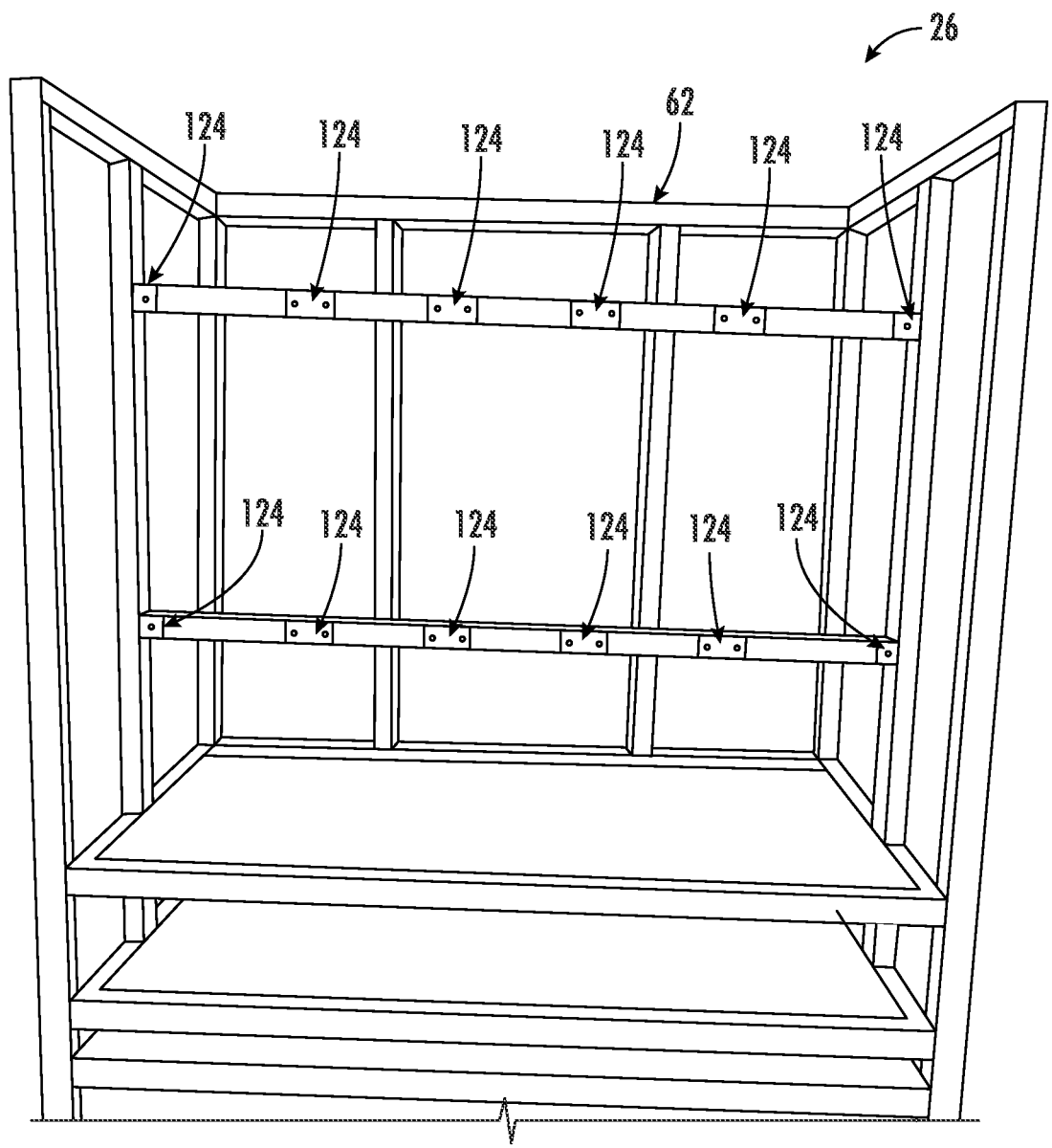
FIG. 17 is a front perspective view of a build frame of a build module in accordance with various aspects of the present disclosure.
Figure 18:
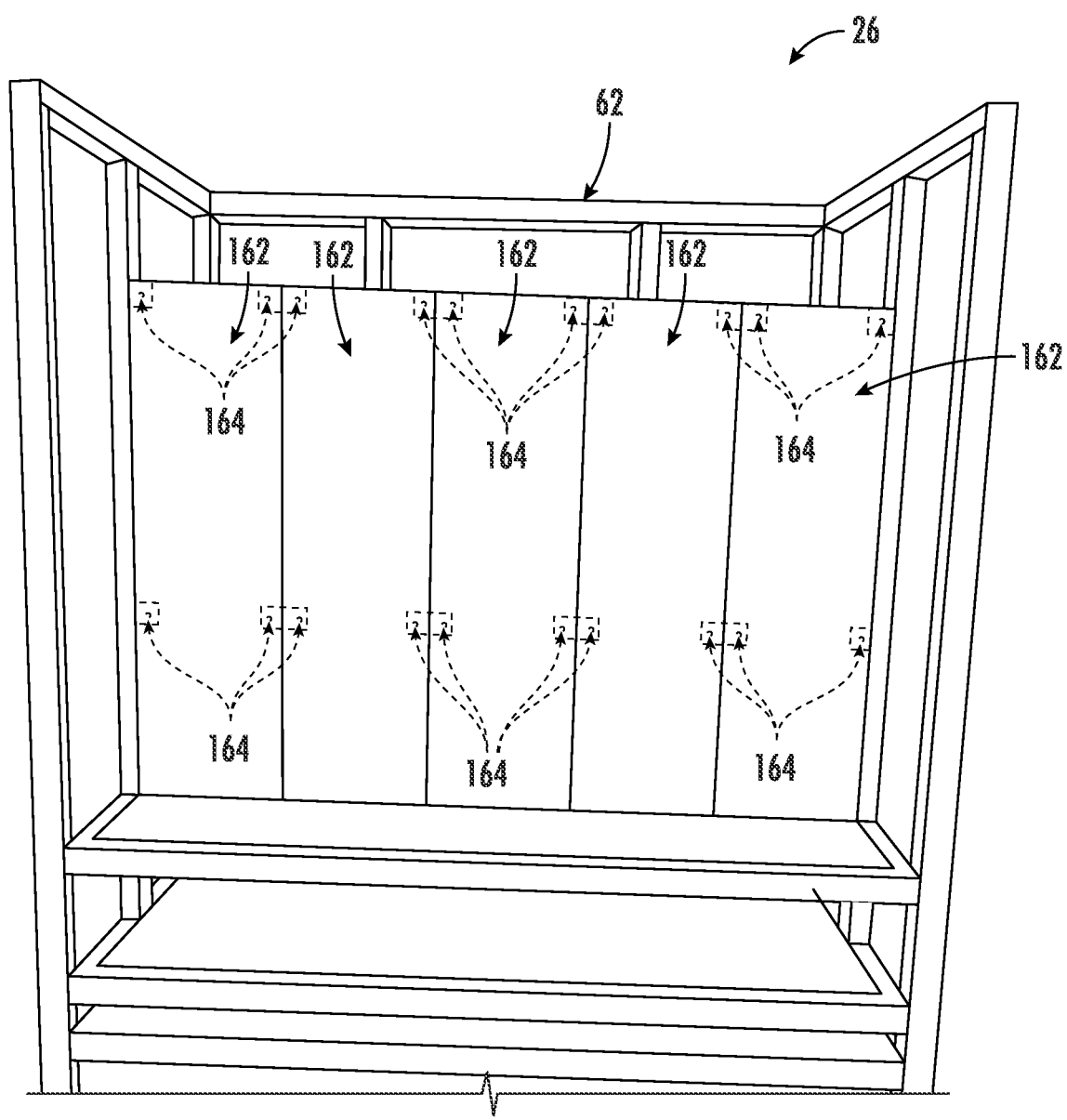
FIG. 18 is a front perspective view of the build frame operably coupled with a plurality of build panels in accordance with various aspects of the present disclosure.

Referring now to FIGS. 17 and 18, front perspective view of the build module 22 is illustrated in accordance with various exemplary embodiments of the present disclosure. In the illustrated embodiment, the build frame 62 may include one or more alignment pads 124 that may be attached to the build frame 62 and/or integrally formed with various portions of the build frame 62. The alignment pads 124 can act as datums to align one or more build panels 162 with a defined position relative to the build frame 62, which, in turn, may align each print module 116 (FIG. 3) relative to the other components of the apparatus 10.

In some embodiments, the build frame 62 may support five build panels 162. Each build panel 162 may include a pair of upper attachment locations and a pair of lower attachment locations. It will be appreciated, however, that the take-up module 26 may include any number of attachment locations 128 without departing from the scope of the present disclosure.

Figure 19:
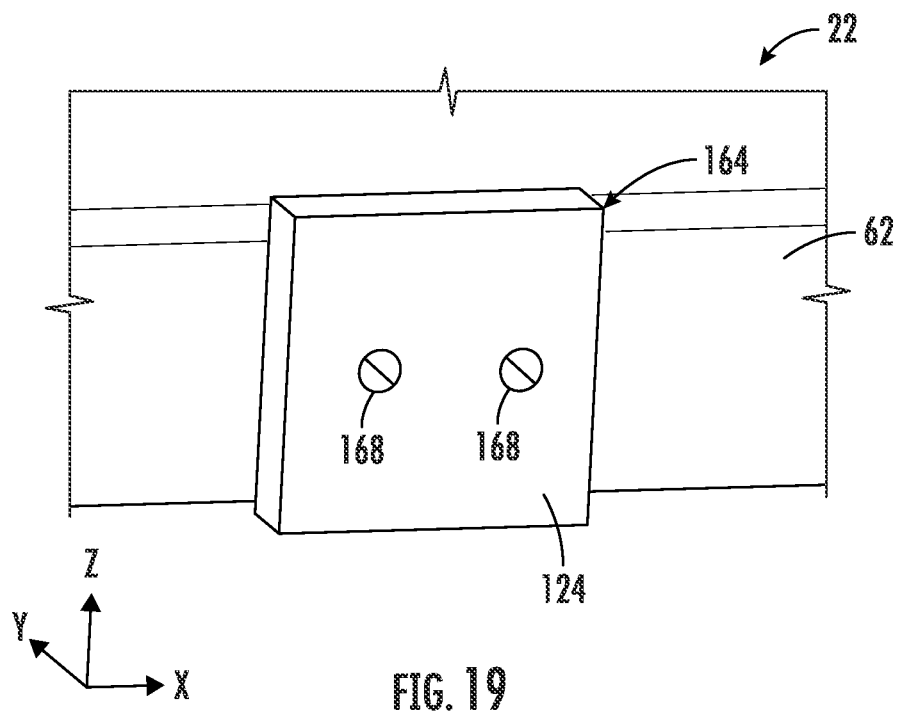
FIG. 19 is a front perspective view of an alignment pad of the build frame in accordance with various aspects of the present disclosure.
Figure 20:
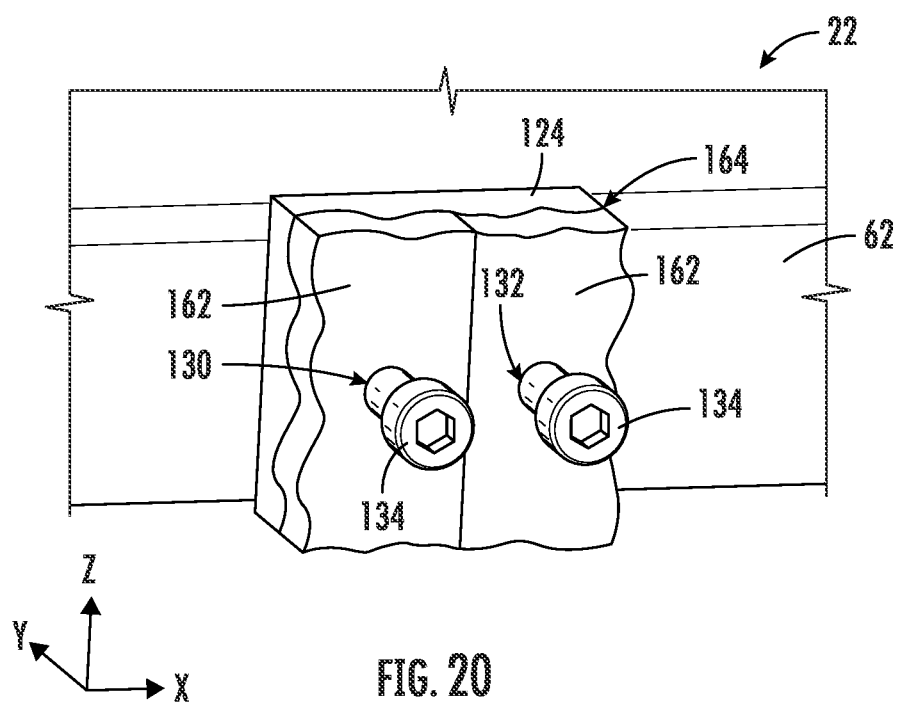
FIG. 20 is a front perspective view of an attachment location of two adjacent build panels in accordance with various aspects of the present disclosure.

Referring to FIGS. 19 and 20, front perspective views of an alignment pad of the build module 22 and an attachment location 164 (FIG. 18) of a pair of build panels 162 are illustrated in accordance with various exemplary embodiments of the present disclosure. In some embodiments, the alignment pads 124 may define a pair of attachment voids 168. The build panels 162 may define a single aperture within each attachment location. In several embodiments, a coupling fastener 134 can be positioned in the first aperture 130 of each build panel 162 and into the attachment void 168 of the alignment pad. As illustrated, in some instances, adjacently positioned build panels 162 may be operably coupled with a common alignment pad 124.

In various examples, once each panel of the apparatus is coupled with an associated frame (e.g., the feed frame 66, the build frame 62, or the take-up frame 70) with one or more fasteners 134, an adjustment assembly may be utilized to adjust a position of at least one of a feed mandrel within the feed module or a take-up mandrel within the take-up module. For example, one or more adjustment fasteners 136 can be used to rotate and/or aligned the feed mandrel 24A and the take-up mandrel 26A in a defined orientation. In addition, the stop 90 of the feed module and/or the stop 114 of the take-up module may be adjusted, which can prevent resin support 28 walking (or other issues).

Figure 21:
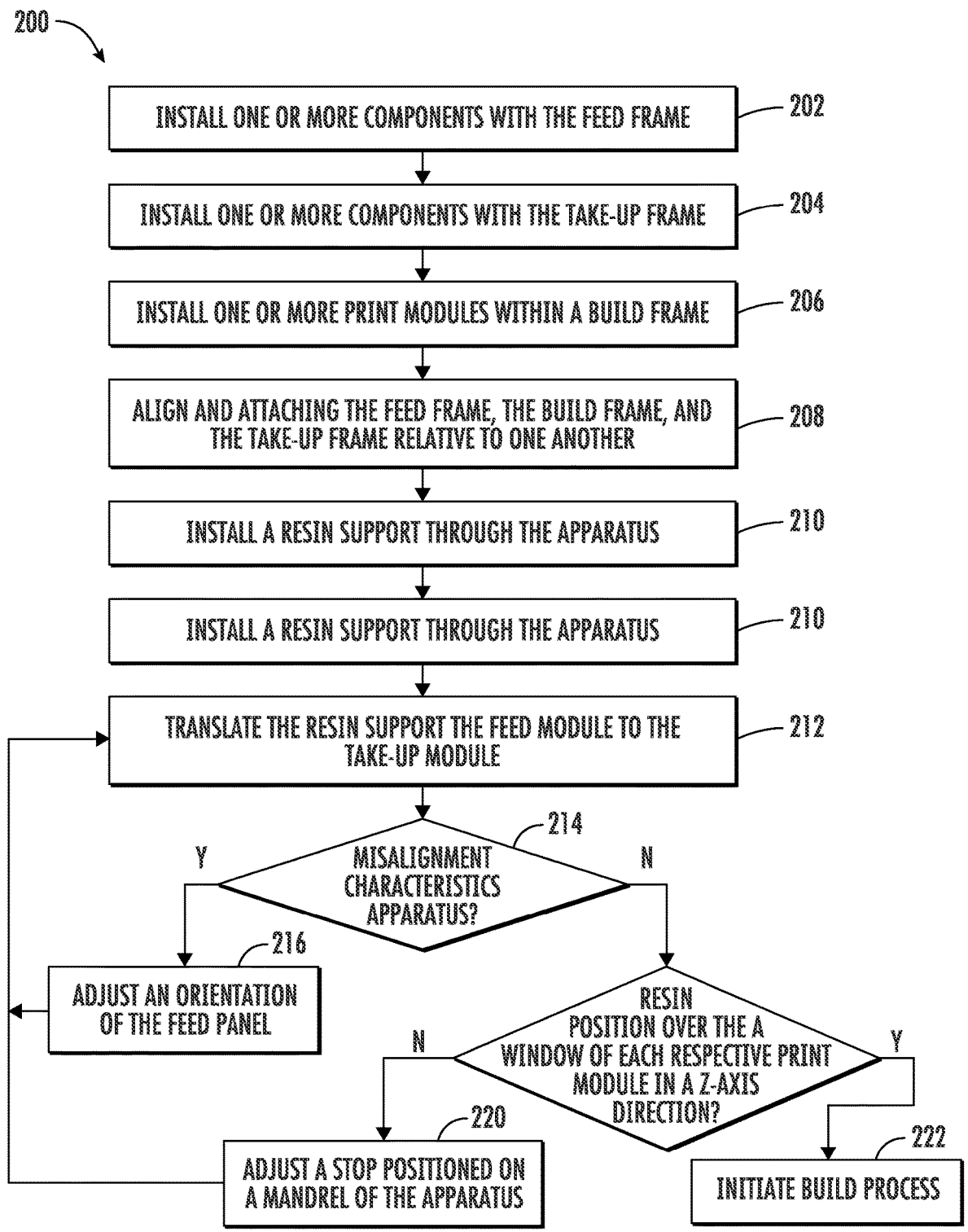
FIG. 21 is a method of assembling the manufacturing apparatus in accordance with various aspects of the present disclosure.
Figure 22:
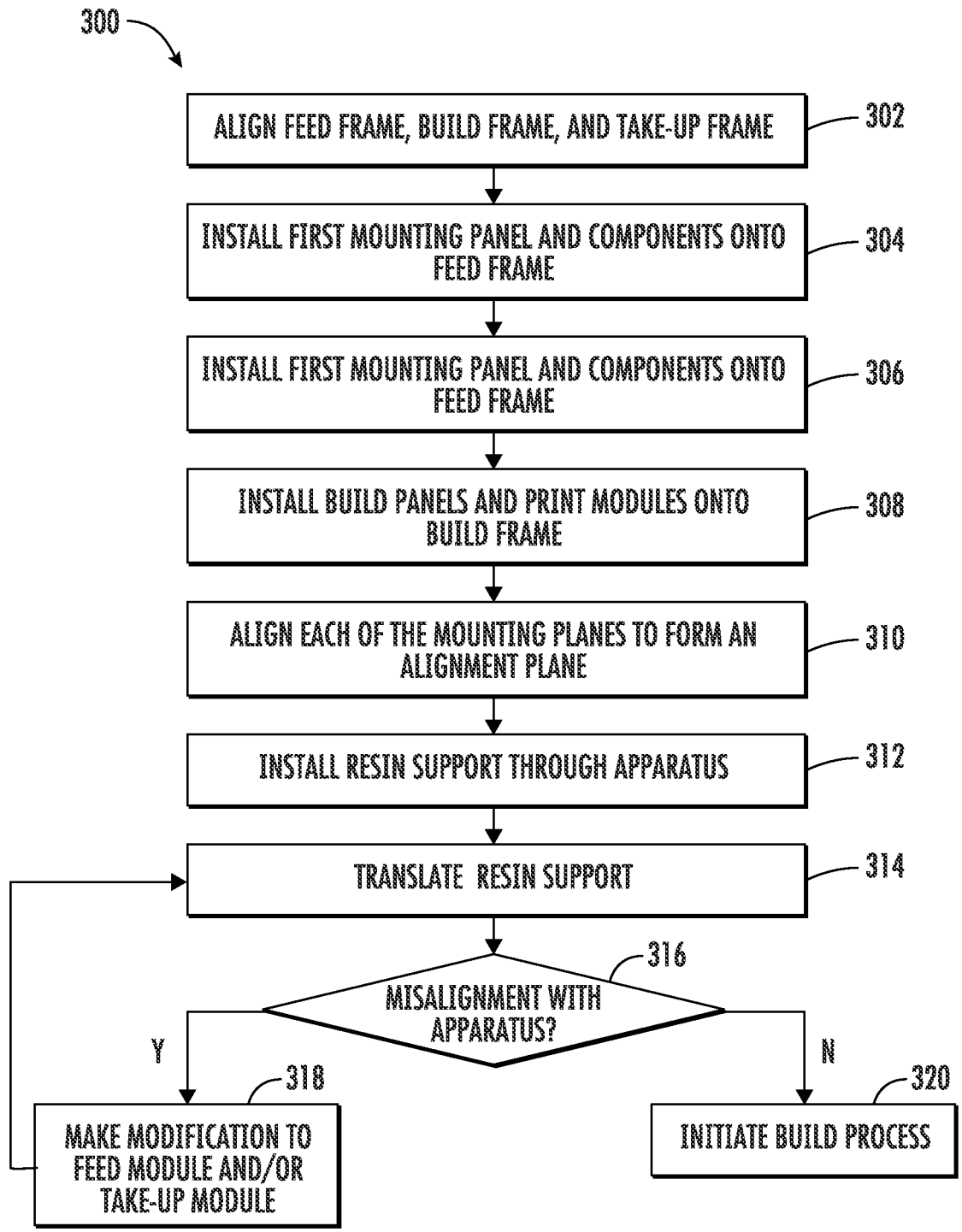
FIG. 22 is a method of assembling the manufacturing apparatus in accordance with various aspects of the present disclosure.

Now that the construction and configuration of the additive manufacturing apparatus has been described according to various examples of the present subject matter, methods 200, 300 for assembling an additive manufacturing apparatus are respectively provided with reference to FIGS. 21 and 22. It should be appreciated that the example methods 200 is discussed herein only to describe example aspects of the present subject matter and is not intended to be limiting. Any of the steps within FIG. 21 may be omitted or rearranged in any other order without departing from the scope of the present disclosure.

Referring now to FIG. 21, a method of aligning the resin can include installing one or more components within the feed frame at step 202. As provided herein, the one or more components may be operably coupled to a feed mounting panel. The feed frame panel may be mounted to the feed frame.

At step 204, the method 200 can include installing one or more components within the take-up frame. As provided herein, the one or more components may be operably coupled to a take-up mounting panel. The take-up frame panel may be mounted to the take-up frame.

At step 206, the method 200 can include installing one or more print modules within a build frame. As provided herein, the one or more print modules may be mounted to one or more build panels. For instance, each print module may be mounted to a respective build panel. However, it will be appreciated that more than one print module may be mounted to a common build panel. The build panels may then be mounted to the build frame.

At step 208, the method 200 can include aligning and attaching the feed frame, the build frame, and the take-up frame relative to one another. In some instances, to align each of the modules relative to one another along the alignment plane, the build frame, the feed frame, and/or the take-up frame may each include one or more one or more mounts. Once the one or more mounts of the feed frame are aligned with the build frame, a coupling fastener may be positioned within the one or more mounts to retain the position of the frames relative to one another. Likewise, once the one or more mounts of the take-up frame are aligned with the build module on an opposing side of the build frame from the feed frame, a coupling fastener may be positioned within the one or more mount to retain the position of the frames relative to one another. As provided herein, the apparatus may include any number of build frames. As such, in instances in which more than one build frame is implemented, the feed frame may be coupled to a first build module and the take-up module may be coupled with a second build module. In addition, the first build frame may be coupled with the second build frame on an opposite side of the first build frame from the feed frame and on an opposite side of the second build frame from the take-up frame.

At step 210, the method 200 can include installing a resin support through the apparatus. In various embodiments, the resin support may have a first portion operably coupled with a feed spool and a second portion operably coupled with a take-up spool. The feed spool may be positioned about a feed mandrel within the feed module. The take-up spool may be positioned about a take-up mandrel within the take-up module. An intermediate portion of the resin support may extend through the build module and along one or more print modules within the build module.

At step 212, the method 200 can include translating the resin support from the feed module to the take-up module. As the resin support is translated, at step 214, the method includes determining whether any misalignment characteristics are present. For example, determining whether any misalignment characteristics are present may include determining whether the resin support is generally moving from its original position in the Y-axis direction indicating misalignment of one or more components and/or the feed mandrel and the take-up mandrel have non-parallel axes of rotation. Additionally or alternatively, determining whether any misalignment characteristics are present may include determining whether any ripples or other variations are present along the resin support.

If any misalignment characteristics are present, at step 216, the method 200 can include adjusting an orientation of the feed panel, the one or more build panels, and/or the take-up panel. As provided herein, each of the feed panel, the one or more build panels, and/or the take-up panel may have their respective orientation adjusted through one or more adjustment screws. Once the orientation of the feed panel, the one or more build panels, and/or the take-up panel is adjusted, the method 200 can return to step 212.

If no misalignment characteristics are present (or a negligible amount of misalignment is present), at step 218, the method includes determining whether the resin provided on the resin support is positioned over the window of each respective print module in a Z-axis direction.

If the resin is not positioned over one or more window, at step 220, the method can include adjusting a stop positioned on a mandrel of the apparatus. For example, a stop of the feed mandrel and/or a stop positioned on a take-up mandrel may be adjusted to align the resin support. Once a stop positioned on a mandrel of the apparatus is adjusted, the method 200 can return to step 212.

If the resin is positioned over each of the one or more windows, at step 222, the method 200 may include initiating a build process.

Referring now to FIG. 22, an alternatively method may be implemented for aligning the resin support within the apparatus. For instance, the method 300, at step 302, can include aligning the feed frame, the build frame, and the take-up frame to one another. In some instances, to align each of the modules relative to one another along the alignment plane, the build frame, the feed frame, and/or the take-up frame may each include one or more one or more mounts. Once the one or more mounts of the feed frame are aligned with the build module, a coupling fastener may be positioned within the one or more mount to retain the position of the frames relative to one another. Likewise, once the one or more mounts of the take-up frame are aligned with the build module on an opposing side of the build frame from the feed frame, a coupling fastener may be positioned within the one or more mount to retain the position of the frames relative to one another. As provided herein, the apparatus may include any number of build frames. As such, in instances in which more than one build frame is implemented, the feed frame may be coupled to a first build module and the take-up module may be coupled with a second build module.

At step 304, the method 300 can include installing a feed mounting panel and components onto the feed frame such that each of the components is mounted within the feed module relative to a feed module mounting plane defined by one or more datums within the feed module. As provided herein, the feed mounting panel may support various components such as a feed mandrel, one or more rollers, a cover, a tension sensor, etc. that can each be positioned on the feed mounting panel.

At step 306, the method 300 can include installing a take-up mounting panel and components onto the take-up frame such that each of the components is mounted within the take-up module relative to a take-up module mounting plane defined by one or more datums within the take-up module. As provided herein, the take-up mounting panel may support various components such as a take-up mandrel, one or more rollers, a reclamation system, etc. that can each be positioned on the take-up mounting panel.

At step 308, the method 300 can include installing a one or more build panels and print modules onto the build frame such that each of the one or more build panels is mounted within the build module relative to a module module mounting plane defined by one or more datums within the build module. As provided herein, each of the build panels may support a print module. Each print module may include a support panel, a window, a stage, an actuator, and/or a radiant energy device.

At step 310, the method 300 can include aligning each of the mounting planes to form an alignment plane. Once the panels within each module are aligned with to define respective mounting planes, the mounting planes are aligned in a co-planar manner to define the alignment plane.

At step 312, the method 300 includes installing a resin support through the apparatus. In various embodiments, the resin support may have a first portion operably coupled with a feed spool and a second portion operably coupled with a take-up spool. The feed spool may be positioned about a feed mandrel within the feed module. The take-up spool may be positioned about a take-up mandrel within the take-up module. An intermediate portion of the resin support may extend through the build module and along one or more print modules within the build module.

At step 314, the method 300 can include translating the resin support from the feed module to the take-up module. As the resin support is translated, at step 316, the method includes determining whether the resin support is generally moving from its original position in the Y-axis direction indicating misalignment of one or more components and/or the feed mandrel and the take-up mandrel have non-parallel axes of rotation.

If the resin support moves from its original position in a longitudinal direction as the resin support is translated in a longitudinal direction, the method 300, at step 318, can include making modification to the feed module, the build module, and/or the take-up module. The modifications can include altering a position of one or more panels within the modules of the apparatus by altering a fastener, which may be in the form of a coupling fastener (e.g., mounting bolt) and/or an adjustment fastener (e.g., a jack screw). If the resin support does not move or moves within a predefined range from its original position as it is translated, the build process may be initiated at step 320.

Figure 23:
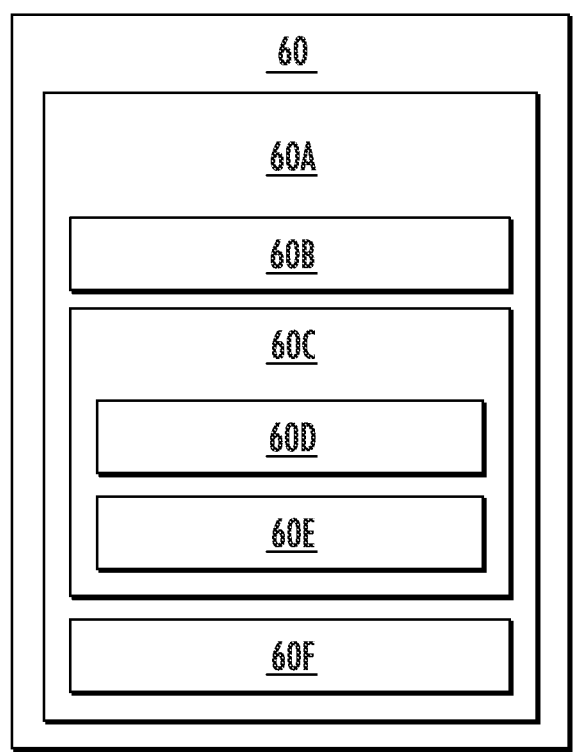
FIG. 23 depicts an exemplary computing system for an additive manufacturing apparatus in accordance with various aspects of the present disclosure.

FIG. 23 depicts certain components of computing system 60 according to example embodiments of the present disclosure. The computing system 60 can include one or more computing device(s) 60A which may be used to implement the methods 200, 300 described herein. The computing device(s) 60A can include one or more processor(s) 60B and one or more memory device(s) 60C. The one or more processor(s) 60B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 60C can include one or more non-transitory computer-readable storage medium(s), such as RAM, ROM, EEPROM, EPROM, flash memory devices, magnetic disks, etc., and/or combinations thereof.

The memory device(s) 60C can include one or more computer-readable media and can store information accessible by the one or more processor(s) 60B, including instructions 60D that can be executed by the one or more processor(s) 60B. The instructions 60D may execute operations of the additive manufacturing apparatus 10 described above. For instance, the memory device(s) 60C can store instructions 60D for running one or more software applications, displaying a user interface, receiving user input, processing user input, etc. In some implementations, the instructions 60D can be executed by the one or more processor(s) 60B to cause the one or more processor(s) 60B to perform operations. The instructions 60D can be software written in any suitable programming language or can be implemented in hardware. Additionally, and/or alternatively, the instructions 60D can be executed in logically and/or virtually separate threads on processor(s) 60B.

The one or more memory device(s) 60C can also store data 60E that can be retrieved, manipulated, created, or stored by the one or more processor(s) 60B. The data 60E can include, for instance, data to facilitate performance of the apparatus 10 described herein. The data 60E can be stored in one or more database(s). The one or more database(s) can be connected to computing system 60 by a high bandwidth LAN or WAN, or can also be connected to the computing system 60 through network(s) (not shown). The one or more database(s) can be split up so that they are located in multiple locales. In some implementations, the data 60E can be received from another device.

The computing device(s) 60A can also include a communication module or interface 60F used to communicate with one or more other component(s) of computing system 60 or the additive manufacturing apparatus 10 over the network(s). The communication interface 60F can include any suitable components for interfacing with one or more network(s), including for example, transmitters, receivers, ports, controllers, antennas, or other suitable components.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

Aspects of the invention(s) are provided by the subject matter of the following clauses, which are intended to cover all suitable combinations unless dictated otherwise based on logic or the context of the clauses and/or associated figures and description:

An additive manufacturing apparatus comprising: a build module; a feed module configured to support a first portion of a resin support, the first portion of the resin support supported by a feed mounting panel; a take-up module configured to support a second portion of the resin support, the second portion of the resin support maintained by a take-up mounting panel and positioned on an opposing side of the build module from the feed module; and an adjustment assembly configured to adjust a position of at least one of a feed mandrel within the feed module or a take-up mandrel within the take-up module.

The additive manufacturing apparatus of one or more of these clauses, wherein the feed mandrel is anchored to the feed mounting panel and configured to maintain the resin support at a first distance from the feed mounting panel.

The additive manufacturing apparatus of one or more of these clauses, wherein the take-up mandrel is anchored to the take-up mounting panel and configured to maintain the resin support at a second distance from the take-up mounting panel.

The additive manufacturing apparatus of one or more of these clauses, wherein the first distance and the second distance are generally equal.

The additive manufacturing apparatus of one or more of these clauses, further comprising: a build frame supporting a first stage; a feed frame supporting the feed mounting panel; and a take-up frame supporting the take-up mounting panel, wherein one or more one or more mounts are positioned on opposing sides of the build frame for aligning the build frame to the feed frame and to the take-up frame.

The additive manufacturing apparatus of one or more of these clauses, further comprising: a first set of alignment pads defined by the feed frame; and a second set of alignment pads defined by the take-up frame, wherein each of the alignment pads within the first set of alignment pads and the second set of alignment pads defines a respective attachment void.

The additive manufacturing apparatus of one or more of these clauses, wherein a first set of attachment locations and a second set of attachment locations each includes a first aperture and a second aperture.

The additive manufacturing apparatus of one or more of these clauses, wherein a coupling fastener is positioned through the first aperture and into the attachment void of the first set of alignment pads or the second set of alignment pads.

The additive manufacturing apparatus of one or more of these clauses, wherein the adjustment assembly includes an adjustment fastener positioned through the second aperture and contacts the alignment pads within the first set of alignment pads and the second set of alignment pads, and wherein the adjustment fastener is configured to provide fine adjustment of one or more mounting planes.

The additive manufacturing apparatus of one or more of these clauses, further comprising: a first mount operably coupled with the feed module; and a second mount operably coupled with the build module, wherein a fastener is positioned through the first and second mounts to fix the position of the feed module relative to the build module, and wherein the first and second mounts extend in a parallel direction to one another, the parallel direction being offset from a mounting plane of the feed module or the build module.

The additive manufacturing apparatus of one or more of these clauses, further comprising: a second stage positioned between the first stage and the take-up module.

A method of assembling an additive manufacturing apparatus, the method comprising: aligning a feed frame, a build frame, and a take-up frame to one another; installing a feed mounting panel and components onto the feed frame to define a feed module mounting plane; installing a take-up mounting panel onto the take-up frame to define a take-up module mounting plane; installing a one or more build panels onto the build frame to define a build module mounting plane; and aligning each of the mounting planes to form an alignment plane.

The method of one or more of these clauses, further comprising: positioning a fastener within a mount of the feed frame and a first mount of the build frame to operably couple the feed frame to a first side of the build frame; and positioning a fastener within a mount of the take-up frame and a second mount of the build frame to operably couple the take-up frame to a second side of the build frame.

The method of one or more of these clauses, further comprising: installing a resin support through the apparatus, wherein the resin support has a first portion operably coupled with a feed spool and a second portion operably coupled with a take-up spool, and wherein an intermediate portion of the resin support extends through the build frame.

The method of one or more of these clauses, wherein the one or more build panels includes a first build panel and a second build panel, the first build panel supporting a first print module and the second build panel supporting a second print module, and wherein the first print module is upstream of the second print module.

The method of one or more of these clauses, further comprising: altering at least one of the feed module mounting plane, the take-up module mounting plane, or the build module mounting plane when a resin support moves from an original position to a misaligned position in a Y-axis direction as the resin support is translated from the feed frame to the take-up frame.

An additive manufacturing apparatus comprising: a build module including a build frame having a first mount on a first side thereof and a second mount on a second side thereof; a feed module including a feed frame, the feed frame including a third mount; and a take-up module including a take-up frame, the take-up frame including a fourth mount, wherein the first mount is operably coupled with the third mount and the second mount is operably coupled with the fourth mount.

The additive manufacturing apparatus of one or more of these clauses, further comprising: a resin support that defines a resin surface to support an uncured layer of resin, a first portion of the resin support position about a feed mandrel and a second portion of the resin support positioned about a take-up mandrel; and a first print module and a second print module within the build module, wherein the first print module is positioned upstream of the second print module, wherein the feed module and the take-up module each adjustable in a Y-axis direction to align the resin support at opposing ends of the build module along the first print module and the second print module.

The additive manufacturing apparatus of one or more of these clauses, further comprising: an alignment pad within a feed frame, the alignment pad defining an attachment void; a coupling fastener positioned through a first aperture defined by a feed mounting panel and within the attachment void; and an adjustment fastener positioned through a second aperture defined by the feed mounting panel, the adjustment fastener configured to contact an alignment pad.

The additive manufacturing apparatus of one or more of these clauses, wherein the first mount and the second mount are welded to the build frame and machined in place to define a plane of an outer surface of the first mount and the second mount relative to the build frame, wherein the third mount is welded to the feed frame and machined in place to define a plane of an outer surface of the third mount relative to the feed frame, and wherein the fourth mount is welded to the take-up frame and machined in place to define a plane of an outer surface of the fourth mount relative to the take-up frame.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing apparatus comprising:
a build module;
a feed module configured to support a first portion of a resin support, the first portion of the resin support supported by a feed mounting panel;
a take-up module configured to support a second portion of the resin support, the second portion of the resin support maintained by a take-up mounting panel and positioned on an opposing side of the build module from the feed module;
an adjustment assembly configured to adjust a position of at least one of a feed mandrel within the feed module or a take-up mandrel within the take-up module;
a build frame supporting a first stage;
a feed frame supporting the feed mounting panel;
a take-up frame supporting the take-up mounting panel;
a first set of alignment pads defined by the feed frame; and
a second set of alignment pads defined by the take-up frame, wherein each of the alignment pads within the first set of alignment pads and the second set of alignment pads defines a respective attachment void.

2. The additive manufacturing apparatus of claim 1, wherein the feed mandrel is anchored to the feed mounting panel and configured to maintain the resin support at a first distance from the feed mounting panel.

3. The additive manufacturing apparatus of claim 2, wherein the take-up mandrel is anchored to the take-up mounting panel and configured to maintain the resin support at a second distance from the take-up mounting panel.

4. The additive manufacturing apparatus of claim 3, wherein the first distance and the second distance are generally equal.

5. The additive manufacturing apparatus of claim 3, wherein one or more mounts are positioned on opposing sides of the build frame for aligning the build frame to the feed frame and to the take-up frame.

6. The additive manufacturing apparatus of claim 1, wherein a first set of attachment locations and a second set of attachment locations each includes a first aperture and a second aperture.

7. The additive manufacturing apparatus of claim 6, wherein a coupling fastener is positioned through the first aperture and into one of the attachment voids of the first set of alignment pads or the second set of alignment pads.

8. The additive manufacturing apparatus of claim 6, wherein the adjustment assembly includes an adjustment fastener positioned through the second aperture and contacts one of the alignment pads within the first set of alignment pads and the second set of alignment pads, and wherein the adjustment fastener is configured to provide fine adjustment of one or more mounting planes.

9. The additive manufacturing apparatus of claim 2, further comprising:
a first mount operably coupled with the feed module; and
a second mount operably coupled with the build module, wherein a fastener is positioned through the first mount and the second mount to fix the position of the feed module relative to the build module, and wherein the first mount and the second mount extend in a parallel direction to one another, the parallel direction being offset from a mounting plane of the feed module or the build module.

10. An additive manufacturing apparatus comprising:
a feed frame configured to support a feed mounting panel and a feed mandrel anchored to the feed mounting panel;
a take-up frame configured to support a take-up mounting panel and a take-up mandrel anchored to the take-up mounting panel;
an adjustment assembly configured to adjust a position of at least one of the feed mandrel or the take-up mandrel;
a first set of alignment pads defined by the feed frame; and
a second set of alignment pads defined by the take-up frame, wherein each of the alignment pads within the first set of alignment pads and the second set of alignment pads defines a respective attachment void.

11. The additive manufacturing apparatus of claim 10, wherein the feed mandrel is configured to maintain a resin support at a first distance from the feed mounting panel.

12. The additive manufacturing apparatus of claim 11, wherein the take-up mandrel is configured to maintain the resin support at a second distance from the take-up mounting panel.

13. The additive manufacturing apparatus of claim 12, wherein the first distance and the second distance are generally equal.

14. The additive manufacturing apparatus of claim 10, further comprising:
a build frame supporting a first stage, wherein one or more one or more mounts are positioned on opposing sides of the build frame for aligning the build frame to the feed frame and to the take-up frame.

15. An additive manufacturing apparatus comprising:
a feed frame configured to support a feed mounting panel and a feed mandrel anchored to the feed mounting panel;
an adjustment assembly configured to adjust a position of the feed mandrel; and
a first set of alignment pads defined by the feed frame, wherein each of the alignment pads within the first set of alignment pads defines a respective attachment void.

16. The additive manufacturing apparatus of claim 15, further comprising:
a take-up frame configured to support a take-up mounting panel and a take-up mandrel anchored to the take-up mounting panel; and
a second set of alignment pads defined by the take-up frame, wherein each of the alignment pads within the second set of alignment pads defines the respective attachment void.

17. The additive manufacturing apparatus of claim 16, wherein a first set of attachment locations and a second set of attachment locations each includes a first aperture and a second aperture.

18. The additive manufacturing apparatus of claim 17, wherein a coupling fastener is positioned through the first aperture and into the attachment void of the first set of alignment pads or the second set of alignment pads.

19. The additive manufacturing apparatus of claim 17, wherein the adjustment assembly includes an adjustment fastener positioned through the second aperture and contacts the alignment pads within the first set of alignment pads and the second set of alignment pads, and wherein the adjustment fastener is configured to provide fine adjustment of one or more mounting planes.

* * * * *